(12) United States Patent
Crites

(10) Patent No.: US 10,615,743 B2
(45) Date of Patent: Apr. 7, 2020

(54) ACTIVE AND PASSIVE MONITORING SYSTEM FOR INSTALLED PHOTOVOLTAIC STRINGS, SUBSTRINGS, AND MODULES

(76) Inventor: David Crites, Los Gatos, CA (US)

(*) Notice: Subject to any disclaimer, the term of this patent is extended or adjusted under 35 U.S.C. 154(b) by 1980 days.

(21) Appl. No.: 13/017,002

(22) Filed: Jan. 29, 2011

(65) Prior Publication Data

US 2012/0049879 A1   Mar. 1, 2012

Related U.S. Application Data

(63) Continuation-in-part of application No. 12/862,742, filed on Aug. 24, 2010, now abandoned.

(51) Int. Cl.
| | |
|---|---|
| G01R 31/26 | (2014.01) |
| H01H 75/00 | (2006.01) |
| H02S 50/10 | (2014.01) |
| H01H 71/10 | (2006.01) |

(52) U.S. Cl.
CPC ......... *H02S 50/10* (2014.12); *H01H 71/1009* (2013.01)

(58) Field of Classification Search
CPC ........... H01L 31/02021; H01L 31/0504; H01L 23/576; H01L 31/02008
USPC .............................. 324/537, 761.01; 136/244
See application file for complete search history.

(56) References Cited

U.S. PATENT DOCUMENTS

| | | | |
|---|---|---|---|
| 4,695,788 A | 9/1987 | Marshall | |
| 5,258,244 A * | 11/1993 | Hall et al. | 429/61 |
| 6,271,462 B1 * | 8/2001 | Tsuzuki et al. | 136/243 |
| 6,351,130 B1 | 2/2002 | Preiser et al. | |
| 7,839,022 B2 * | 11/2010 | Wolfs | 307/77 |
| 7,864,497 B2 * | 1/2011 | Quardt et al. | 136/244 |
| 8,159,238 B1 * | 4/2012 | Krasowski et al. | 324/713 |
| 2003/0159728 A1 * | 8/2003 | Berry | 136/256 |
| 2005/0172995 A1 * | 8/2005 | Rohrig | H01L 31/02021 136/243 |
| 2006/0237058 A1 * | 10/2006 | McClintock et al. | 136/244 |
| 2007/0223381 A1 * | 9/2007 | Radtke | H04B 3/54 370/236 |
| 2008/0106250 A1 | 5/2008 | Prior et al. | |
| 2008/0303503 A1 * | 12/2008 | Wolfs | 323/301 |
| 2008/0306700 A1 * | 12/2008 | Kawam et al. | 702/64 |
| 2009/0012917 A1 | 1/2009 | Thompson et al. | |
| 2009/0179662 A1 | 7/2009 | Moulton et al. | |
| 2009/0183760 A1 * | 7/2009 | Meyer | 136/244 |

(Continued)

FOREIGN PATENT DOCUMENTS

| | | |
|---|---|---|
| DE | 9411783 B1 | 2/1995 |
| JP | 4437865 B2 | 3/2010 |

(Continued)

OTHER PUBLICATIONS

Keun Yong Park, Korean Intellectual Property Office; International Search Report and Written Opinion; dated Mar. 23, 2012; Korea.

(Continued)

*Primary Examiner* — Huy Q Phan
*Assistant Examiner* — Adam S Clarke
(74) *Attorney, Agent, or Firm* — David Crites

(57) ABSTRACT

A photovoltaic (PV) monitoring system measures the health of PV installations by measuring, calculating, and reporting the passive (dark) and active (illuminated) electrical characteristics of the PV strings, substrings, and modules that comprise the installation.

26 Claims, 18 Drawing Sheets

(56) References Cited

U.S. PATENT DOCUMENTS

| | | | |
|---|---|---|---|
| 2009/0190275 A1* | 7/2009 | Gilmore et al. | 361/42 |
| 2009/0207543 A1 | 8/2009 | Boniface et al. | |
| 2010/0013665 A1 | 1/2010 | Choy et al. | |
| 2010/0032002 A1* | 2/2010 | Seymour et al. | 136/244 |
| 2010/0071742 A1* | 3/2010 | de Rooij et al. | 136/244 |
| 2010/0085670 A1 | 4/2010 | Palaniswami et al. | |
| 2010/0149847 A1* | 6/2010 | Kernahan | 363/142 |
| 2010/0198424 A1* | 8/2010 | Takehara | H01L 31/02021 700/298 |
| 2011/0073150 A1* | 3/2011 | Hightower et al. | 136/244 |
| 2011/0199707 A1* | 8/2011 | Kazemi et al. | 361/47 |
| 2011/0218687 A1* | 9/2011 | Hadar | H01L 31/02021 700/292 |
| 2011/0273163 A1* | 11/2011 | Jungerman et al. | 324/126 |
| 2012/0043988 A1* | 2/2012 | Ramsey et al. | 324/761.01 |
| 2012/0048326 A1* | 3/2012 | Matsuo et al. | 136/244 |
| 2012/0049855 A1 | 3/2012 | Crites | |
| 2013/0181736 A1* | 7/2013 | Gostein et al. | 324/761.01 |

FOREIGN PATENT DOCUMENTS

| | | |
|---|---|---|
| WO | WO-2009101102 A1 | 8/2009 |
| WO | WO-2009026602 A1 | 5/2010 |

OTHER PUBLICATIONS

D. L. King, B. R. Hansen, et. al.; Dark Current-Voltage Measurements on Photovoltaic Modules as a Diagnostic or Manufacturing Tool; 26th IEEE Photovoltaic Specialists Conf.; (Continued) Sep. 29-Oct. 3, 1997; Anaheim, California; Sandia National Laboratories; USA; http://citeseerx.ist.psu.edu/viewdoc/summary?doi=10.1.1.40.747.

* cited by examiner

# ACTIVE AND PASSIVE MONITORING SYSTEM FOR INSTALLED PHOTOVOLTAIC STRINGS, SUBSTRINGS, AND MODULES

CROSS-REFERENCE TO RELATED APPLICATIONS

This application is a continuation-in-part of application Ser. No. 12/862,742, filed 24 Aug. 2010.

STATEMENT REGARDING FEDERALLY SPONSORED RESEARCH OR DEVELOPMENT

N/A

REFERENCE TO SEQUENCE LISTING, A TABLE, OR A COMPUTER PROGRAM LISTING COMPACT DISC APPENDIX

N/A

FIELD OF THE INVENTION

The invention is related to apparatus and method for testing and monitoring the characteristics and performance of PV installations.

BACKGROUND OF THE INVENTION

The output of a PV installation depends upon maintaining the health of the PV modules that comprise the installation. A number of factors affect the health of PV modules. Such factors include infiltration, soiling, shading, ionizing radiation, interconnect integrity, electrostatic discharge, temperature stress, coating degradation, theft, bypass diode failure, and manufacturing variation.

PV installation monitoring provides information about the health of an installation and thus supports its maintenance and repair. Conventional methods that monitor the active output current of PV strings provide useful information about string-level health but are unable to distinguish between electrical and illumination issues, can not measure health at the substring or module level, and can not determine the health of the bypass diodes.

Unlike conventional methods the invention provides a system and method for monitoring both the active and passive characteristics of the strings that comprise PV installations in order to better distinguish between health issues caused by illumination issues and those caused by electrical issues. Unlike conventional methods the invention further provides a system and method for monitoring substring and module health in order to better isolate the location of health issues.

Previous systems and methods for monitoring PV substrings and bypass diodes have required the installation of either costly equipment or costly wiring. Unlike previous systems and methods, the invention is capable of monitoring substrings and bypass diodes at a low incremental equipment cost and low incremental wiring cost.

SUMMARY OF THE INVENTION

Figure 1:
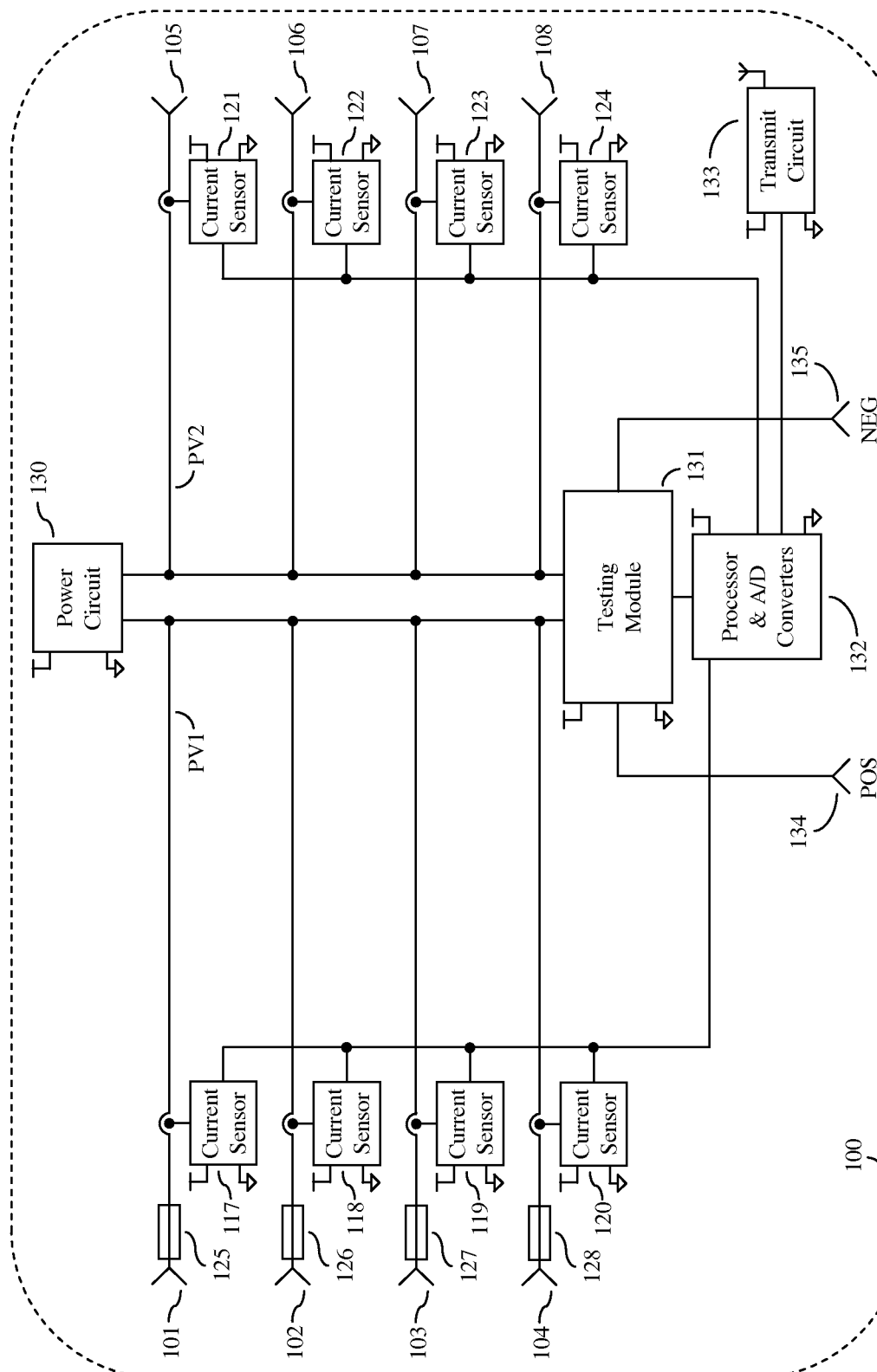
FIG. 1 illustrates a first embodiment of a PV circuit monitoring unit of the invention.

It is the object of the invention to provide a system, comprised of one or more units, capable of monitoring and reporting the active and passive electrical characteristics of the strings, substrings, and modules that comprise PV installations.

It is yet another object of the invention to provide a method for determining and reporting the health of a PV installation by monitoring the active and passive characteristics of its strings, substrings, and modules.

It is yet another object of the invention to provide a system and method for altering the topology of a PV installation.

DETAILED DESCRIPTION

The monitoring system of the invention is comprised of one or more in-situ monitoring units of the invention and, optionally, the networking and general purpose computing resources common in the art.

In this description and the associated claims: a "string" is a plurality of PV modules that are connected exclusively in series, anode-to-cathode, having exactly one anode that does not connect to exactly one cathode and exactly one cathode that does not connect to exactly one anode; a "substring" is one or more contiguous PV modules that comprise a string; an "end module" is the one module in a string having an anode that does not connect to exactly one cathode, and the one module in said string having a cathode that does not connect to exactly one anode; an "end substring" is a substring comprised of any number of modules and at least one end module; a "string end" or "end of a string" is the anode in a string that does not connect to exactly one cathode, and the cathode in a string that does not connect to exactly one anode; a "substring end" or "end of said substring" is the anode in a substring that does not connect to exactly one cathode in said substring, and the cathode in said substring that does not connect to exactly one anode in said substring; "disjoint substrings" are substrings that share no modules; "topology" is the network of PV module and component interconnections that comprise a PV installation; a "test-switch-series" is one or more switches, each with three or more terminals, that are connected in series, first-terminal-to-third-terminal, wherein each first terminal in said series is connected to exactly one third terminal in said series (excepting exactly one switch in said series), each third terminal in said series is connected to exactly one first terminal in said series (excepting exactly one switch in said series), and the second terminal of each switch in said series is connected to a unique electrode of a PV string; the "root switch" of a test-switch-series is the one switch in said series that does not connect to exactly one third terminal in said series; the "terminal switch" of a test-switch-series is the one switch in said series that does not connect to exactly one first terminal in said series; the "next switch" of a test-switch-series is the switch that is connected to the third terminal of a given switch; the "root test point" of a test-switch-series is a conductor connected to the first terminal of the root switch of said series. A "junction box" is a container for electrical connections that may include terminals for joining wires and may include bypass diodes; "connected" is generally used to indicate direct or indirect electrical coupling; and "disconnected" is generally used to indicate direct decoupling.

The monitoring system of the invention is comprised of a circuit or multi-circuit monitoring unit that manages and measures active and passive tests on the modules that make up PV power generation circuits. Unlike passive monitoring units common in the art, circuit and multi-circuit monitoring units of the invention contain a non-PV stimulus circuit capable of driving energy through a dark PV circuit. Unlike string-level monitoring units common in the art, optional series or parallel monitoring units of the invention may be embedded in an installation to provide a means for testing individual modules, panels, or substrings. Series and parallel monitoring units are comprised of one or more switches capable of temporarily altering the topology of the installed array so a circuit or multi-circuit monitoring unit may manage and measure tests performed on sub-circuits of the normal power generating circuits. Fully configured circuit or multi-circuit monitoring units include a means for controlling the series and parallel monitoring units, preferably using minimal additional wiring. Optional combiner monitoring units of the invention may also be installed when the topology of an installation calls for current consolidation in the middle of a power generation circuit.

Figure 7:
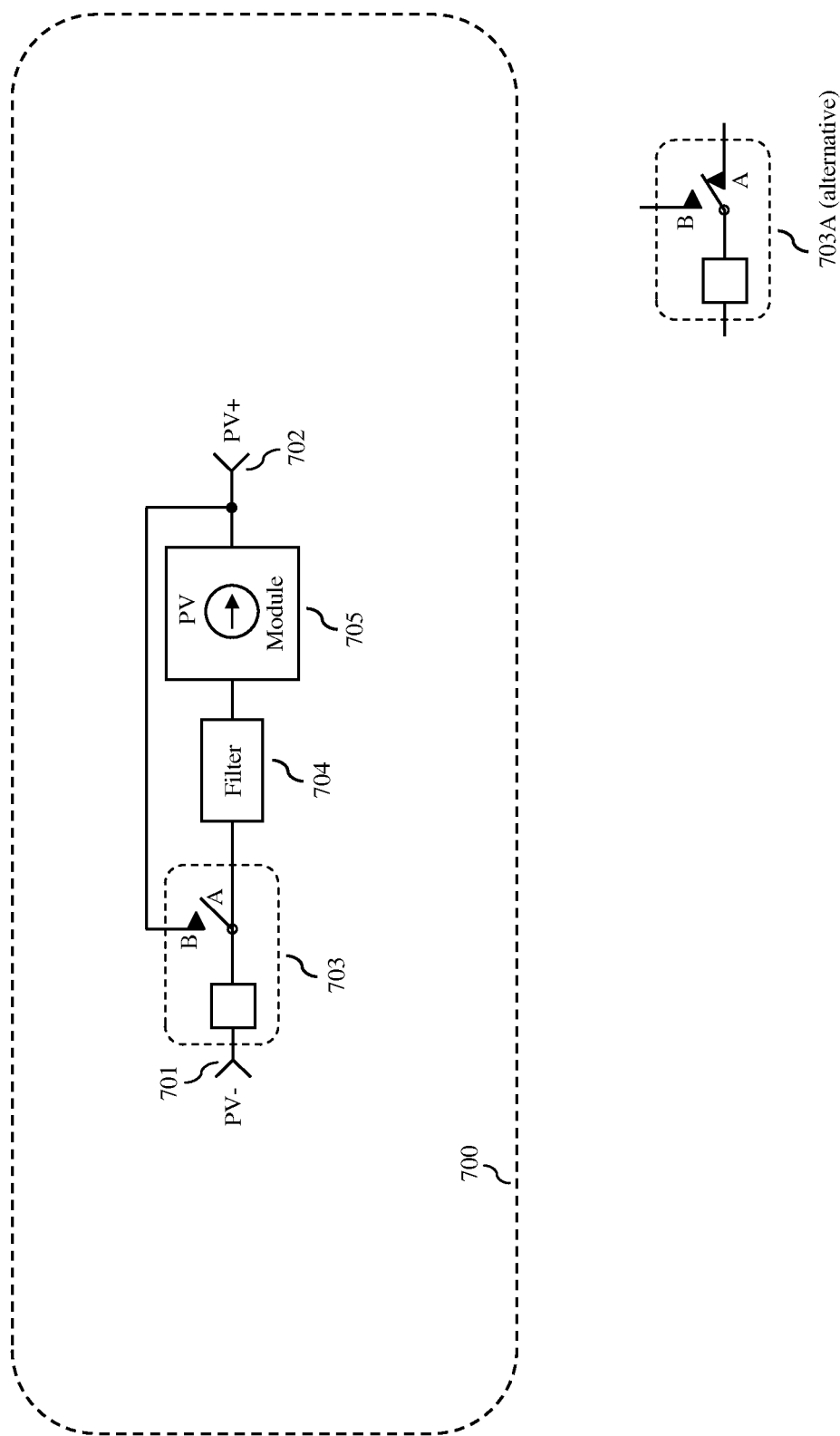
FIG. 7 illustrates a first embodiment of a PV series monitoring unit of the invention, integrated into a PV junction box.
Figure 8:
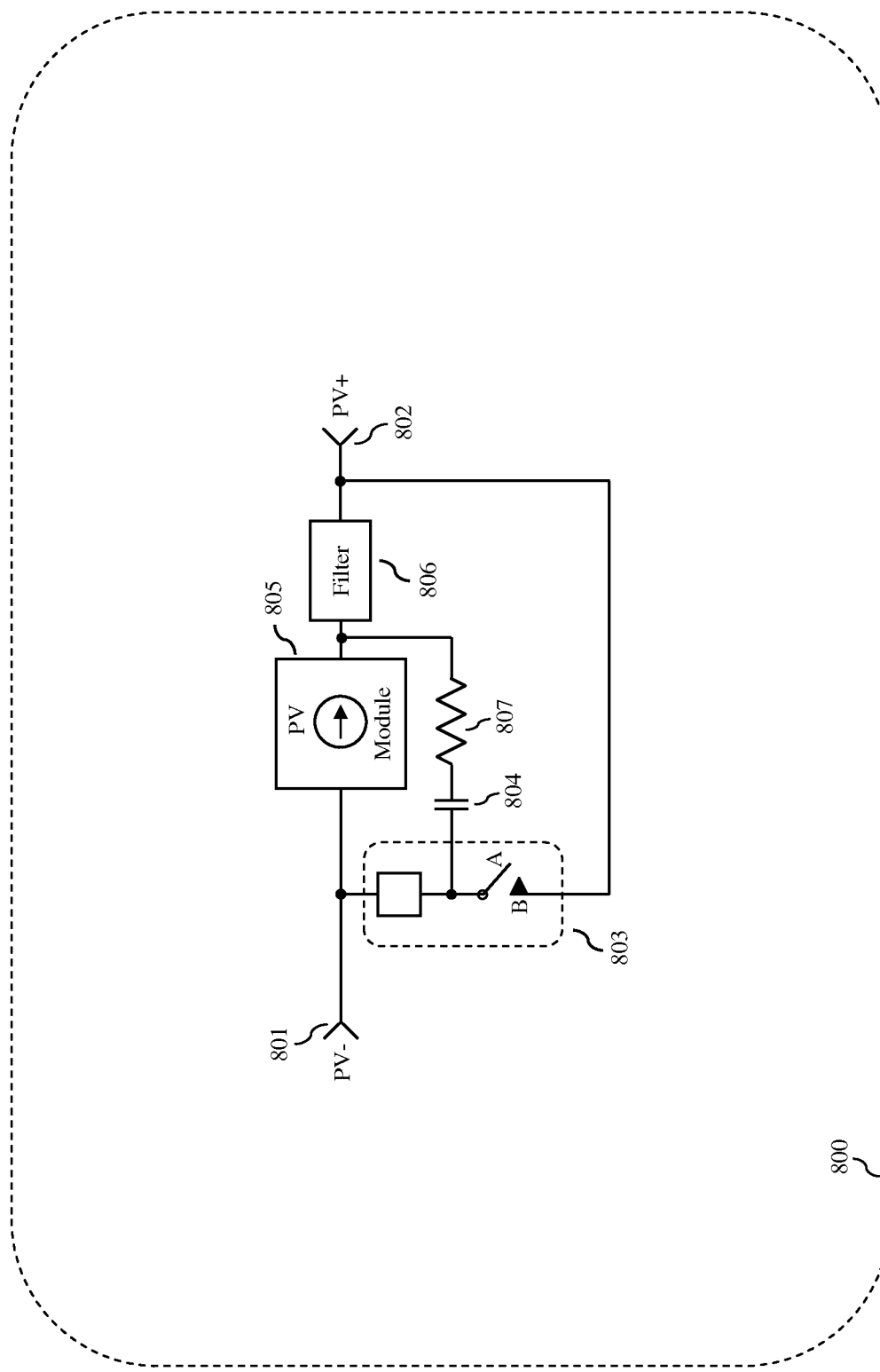
FIG. 8 illustrates a second embodiment of a PV series monitoring unit of the invention, integrated into a PV junction box.
Figure 18:
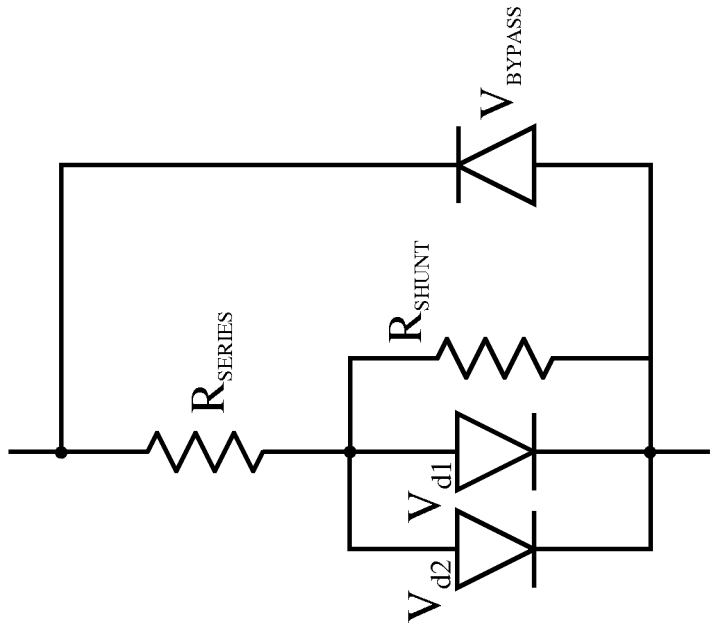
FIG. 18 illustrates a representative IV signature and representative circuit model of a representative PV module.
Figure 18:
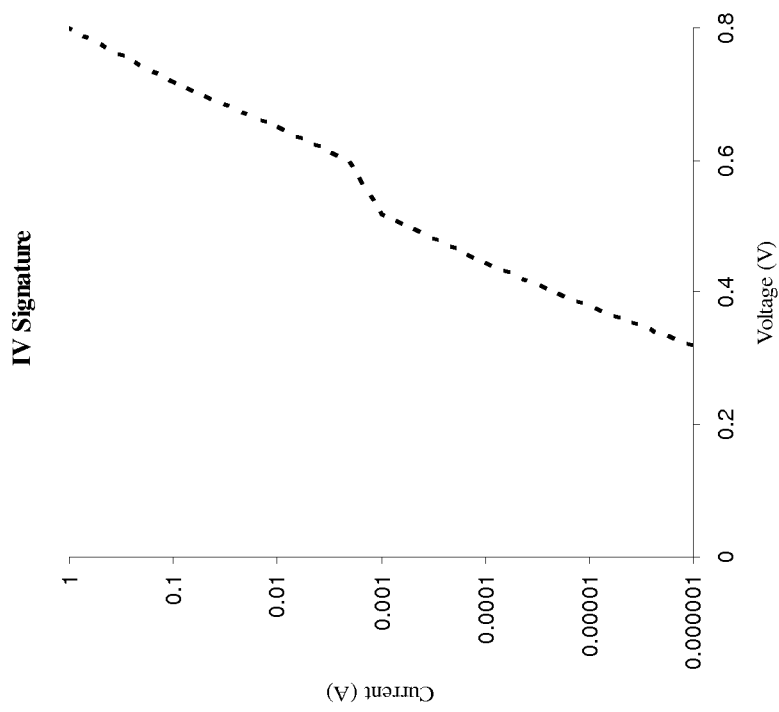

FIG. 1 illustrates one embodiment of the circuit monitoring unit of the invention. A circuit monitoring unit consolidates PV current at both ends of a PV circuit, uses electronics to monitor the health of the circuit through active and passive tests, and may control optional units capable of temporarily altering the topology of the installation so that substring health can be assessed. For convenience of illustration, FIG. 1 consolidates the positive (101-104) and negative (105-108) ends of four PV strings, but the embodiment scales to support any number of strings. Terminals (134 and 135) pass PV generated current (POS and NEG) to external power components common in the art, such as a charge controllers or inverters. Current sensors (117-124) may be enabled and polled by the processor (132), as necessary, to measure the currents flowing in and out of the circuit monitoring unit. In some configurations, some of the illustrated current sensors (117-124) may be redundant and may be eliminated because they measure currents that are measured by other sensors. Note that, as illustrated, sensed currents may be measured and subtracted to detect fault currents in the array. When enabled, current sensors (117-124) convert measured currents to digital data and forward the data to a processor (132) for storage, analysis, and transmission (133) to other devices. In this embodiment, current sensors (117-124) and A/D converters (132) comprise a sensor circuit that can measure the passive and active characteristics of each test circuit. Fuses (125-128) provide protection from string faults. A power circuit (130) provides electrical energy and energy management functions common in the art that may include, but are not limited to, mains power, battery power, power conversion, sleep management, electrical isolation, voltage regulation, and battery charging. A testing module (131) provides a means to: a) measure the passive or dark electrical characteristics of the strings, substrings, or diodes under test while applying a non-PV stimuli and an optional open, short, or load across the modules under test; b) measure the active or illuminated PV characteristics of the strings, substrings, or diodes under test while applying an optional open, short, non-PV stimulus, or load across the modules under test; and c) alter the topology of the test circuit by applying a non-PV stimulus or PV operating current in order to open or close switches in the array. The non-PV stimulus produced by a testing module (131) may include pulsating current, AC current, multiple DC currents, varied current, pulsed DC current, or any electrical stimulus capable of driving one or more current values through the modules or diodes being tested or toggling switches that alter the test topology. The circuit monitoring unit in FIG. 1 may be used, as illustrated, with series or parallel monitoring unit embodiments that are installed using single-conductor wiring (FIGS. 7-8). A processor (132) initiates active tests while the installation is illuminated and passive tests while the installation is in darkness or twilight. Active current tests are performed by sampling the PV-generated currents in each string or substring in order to assess their relative resistivity. Active IV tests are performed by sampling the circuit voltage and the PV current in each string or substring in order to compute their absolute resistive values and diode parameters. Passive current tests are performed by applying non-PV stimuli through the strings or substrings that normally carry PV generated current while sampling the contemporaneous currents. Passive IV tests are performed by applying non-PV stimuli while measuring both the current and the voltage in order to compute absolute resistive values and diode parameters for each string or substring. Both active and passive IV tests may be used to compute IV signatures (FIG. 18) of strings, substrings, and modules in order to assess both their un-illuminated and illuminated health. When active PV current is produced by the modules in the test circuit the voltages and currents may be recorded and used to characterize the illuminated signature of each test string. When passive test current is driven in the direction opposite the normal photovoltaic current the voltages and currents through each string may be used to characterize the un-illuminated signature of each test string. When passive test current is driven in the same direction as normal photovoltaic current the voltages and currents through each test string may be used to compute the signature of each bypass string under test. Following data collection, a curve fitting algorithm, common in the art, may be used to perform a non-linear parameter estimation to determine the shunt resistance, series resistance, diode saturation currents, and non-ideal diode factor (FIG. 18) of the monitored modules and bypass diodes. FIG. 18 illustrates one model of a PV module or string. Other electrical models will yield different, but similarly useful, sets of parameters that may be computed based on passive or active tests.

Figure 2:
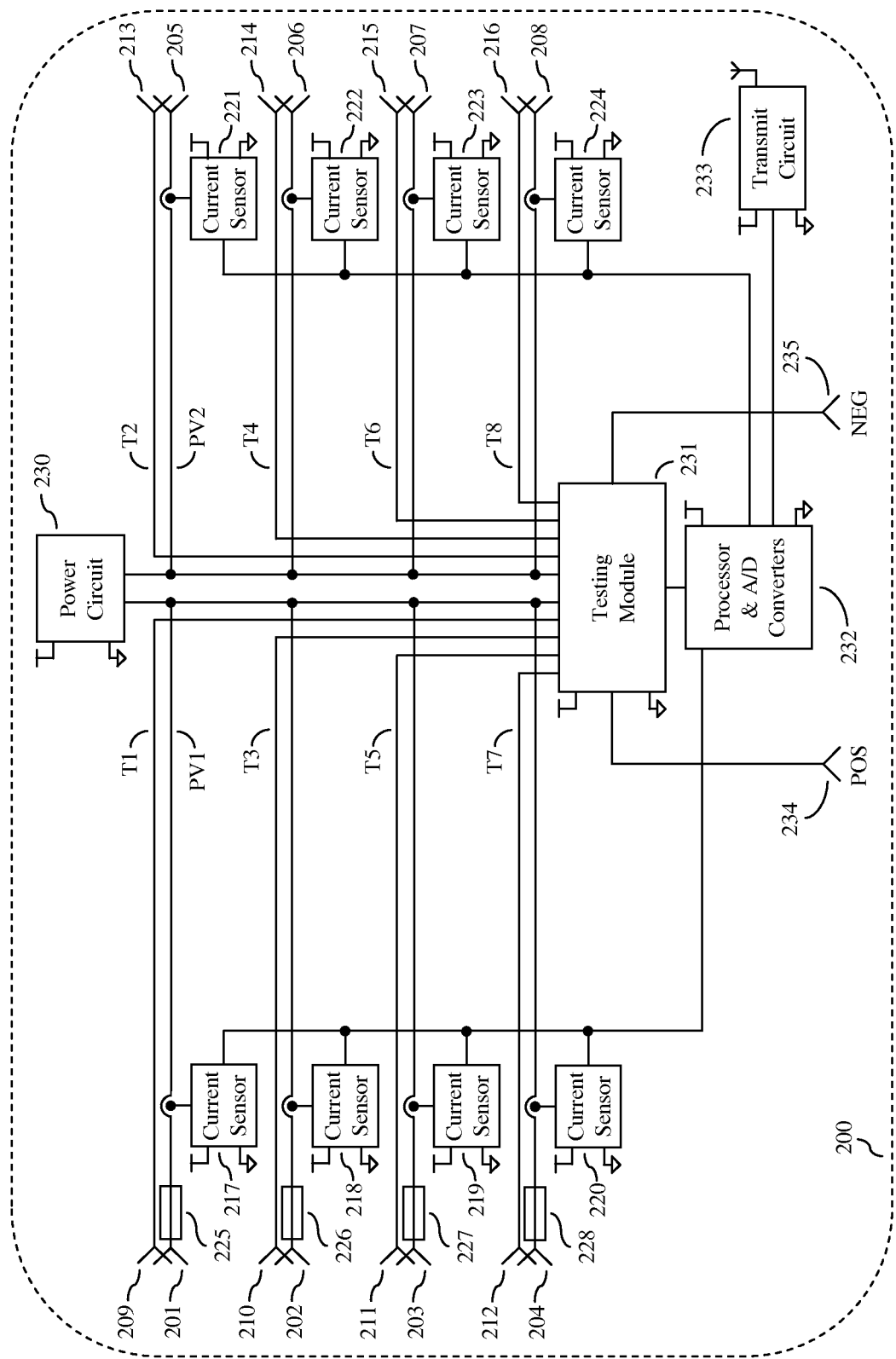
FIG. 2 illustrates a second embodiment of a PV circuit monitoring unit of the invention.

FIG. 2 illustrates an alternative embodiment of the circuit monitoring unit of the invention. In FIG. 2, each positive terminal (201-204) and negative terminal (205-208) is paired with a test terminal (209-216). Positive terminals (201-204) consolidate positive current from parallel strings of PV modules, negative terminals (205-208) consolidate negative current from the opposite ends of the same strings, and test terminals (209-216) are a test harnesses for dual-conductor series or parallel monitoring units wired into the PV array. The FIG. 2 embodiment may be used, as illustrated, with series or parallel monitoring unit embodiments having one test conductor per PV conductor (FIG. 9) but may also be scaled for use with series or parallel monitoring unit embodiments with more than one test conductor per PV conductor (FIG. 10). In some configurations, some of the FIG. 2 current sensors (217-224) may be redundant, and in some configurations current sensors may be placed at other terminals (209-212 or 213-216) instead of, or in addition to, the terminals shown (201-204 or 205-208). In this embodiment, current sensors (217-224) and A/D converters (232) comprise a sensor circuit that can measure the passive and active characteristics of each test circuit. A testing module (231) provides a means to: a) measure the passive or dark electrical characteristics of the strings, substrings, or diodes under test while applying a non-PV stimuli and an optional open, short, or load across the modules under test; b) measure the active or illuminated PV characteristics of the strings, substrings, or diodes under test while applying an optional open, short, non-PV stimuli, or load across the modules under test; and c) alter the topology of the test circuit by applying non-PV stimuli or PV operating current in order to open or close switches. Both FIGS. 1 and 2 perform active and passive testing of PV strings, substrings, and diodes; and may toggle optional switches in the array in order to perform finer-grained testing. FIG. 1 illustrates an embodiment used in installations with single-conductor wiring per string, while FIG. 2 illustrates an embodiment used in installations with multi-conductor wiring per string.

Figure 3:
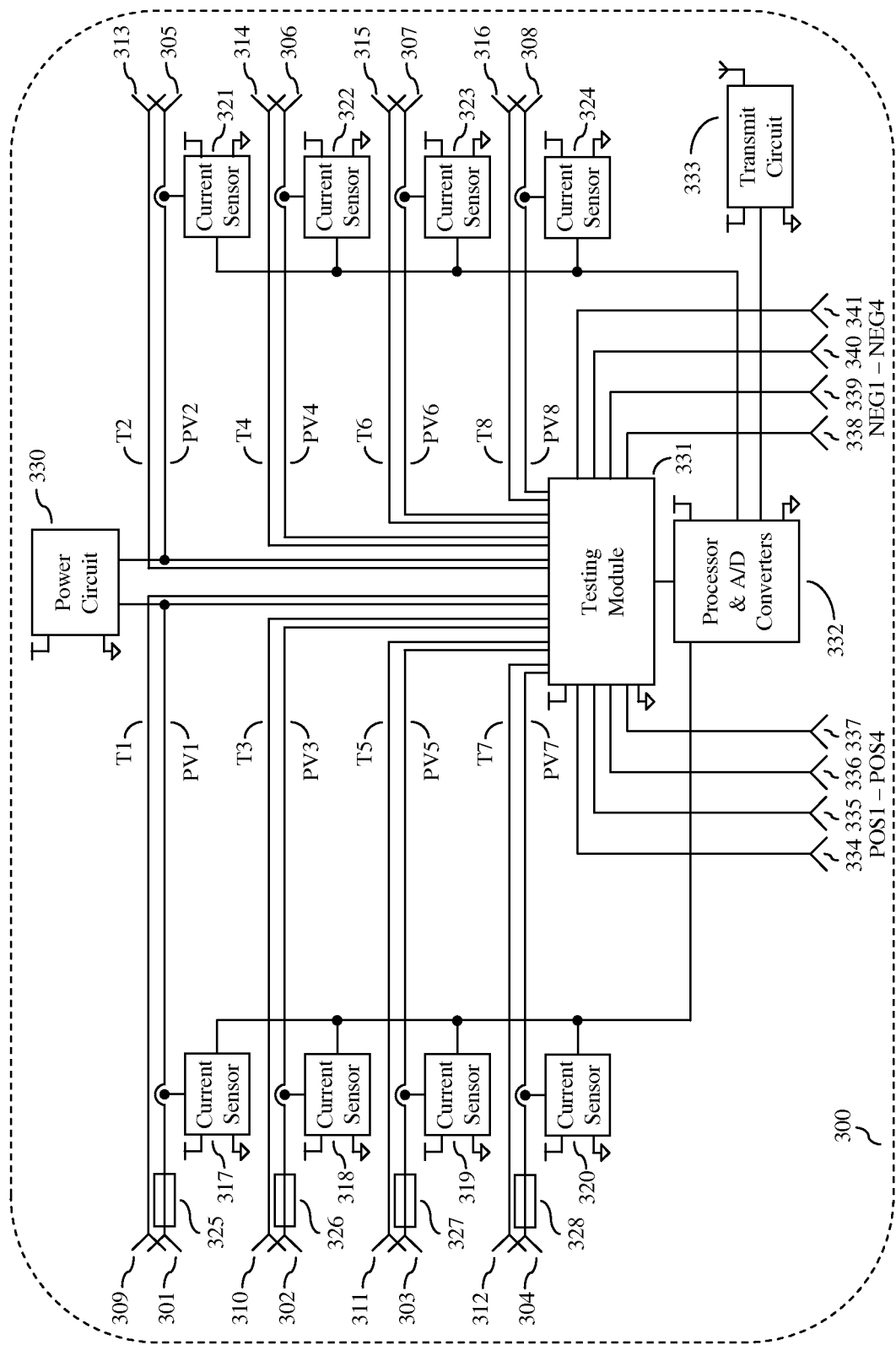
FIG. 3 illustrates an embodiment of a PV multi-circuit monitoring unit of the invention.

FIG. 3 illustrates one embodiment of the multi-circuit monitoring unit of the invention. A multi-circuit monitoring unit monitors the health of multiple independent PV circuits using one monitoring unit. For convenience of illustration, FIG. 3 shows a multi-circuit monitoring unit capable of monitoring four separate PV circuits, but this embodiment scales to support any number of separate PV circuits. Terminals (334-337 and 338-341) pass generated PV current (POS1-POS4 and NEG1-NEG4) to external power components common in the art, such as combiner boxes or maximum power point trackers. For convenience of illustration, one test conductor is paired with each PV conductor in FIG. 3, however the actual number of test conductors per PV conductor is determined by the series or parallel monitoring units being used, and the FIG. 3 embodiment may be scaled to accommodate multiple test conductors per PV conductor. In some configurations, some of the illustrated current sensors (317-324) may be redundant, and in some configurations current sensors may be placed at other terminals (309-312 or 313-316) instead of, or in addition to, the terminals shown (301-304 or 305-308). In this embodiment, current sensors (317-324) and A/D converters (332) comprise a sensor circuit that can measure the passive and active characteristics of each test circuit.

Figure 4:
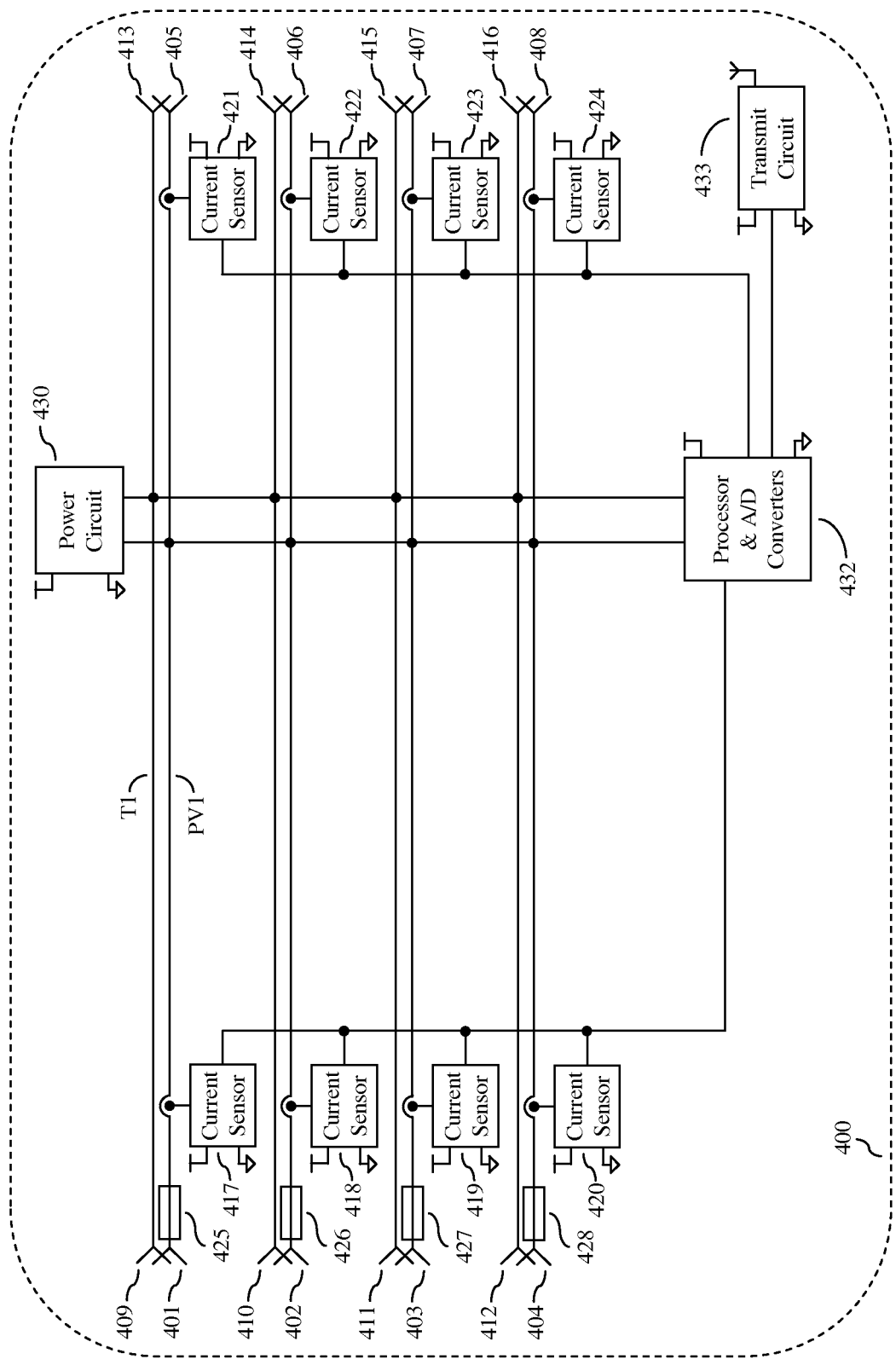
FIG. 4 illustrates an embodiment of a PV combiner monitoring unit of the invention.

FIG. 4 illustrates one embodiment of the combiner monitoring unit of the invention. A combiner monitoring unit monitors PV current (and, optionally, voltage) in the middle of a PV circuit when current consolidation is required by the PV installation topology. Note that the FIG. 4 embodiment may be scaled to accommodate installations with fewer or more parallel strings or fewer or more conductors per string. A power circuit (430) provides electrical energy and management functions common in the art that may include, but are not limited to, mains power, battery power, power conversion, voltage regulation, sleep management, electrical isolation, and battery charging. In this embodiment, sub-string monitoring is initiated by the array's circuit monitoring unit, during which the combiner monitoring unit's processor (432) enables the current sensors (417-424) to record currents or IV pairs from the substrings running in and out of the combiner monitoring unit. In some configurations, some of the illustrated current sensors (417-424) may be redundant and may be eliminated because they measure currents that are measured by other sensors. When enabled, current sensors (417-424) convert measured currents to digital data and forward the data to the processor (432) for storage, analysis, and transmission (433) to other devices. During active and passive current tests a combiner monitoring unit's processor (432) enables the current sensors (417-424) to record contemporaneous current values from the parallel strings running in and out of the unit. In this embodiment, the current sensors (417-424) and A/D converters (432) comprise a sensor circuit that can measure the passive and active characteristics of each test circuit. During active and passive IV tests the combiner monitoring unit's processor (432) records voltage values (between PV1 and T1) concurrently with the current measurements.

Figure 5:
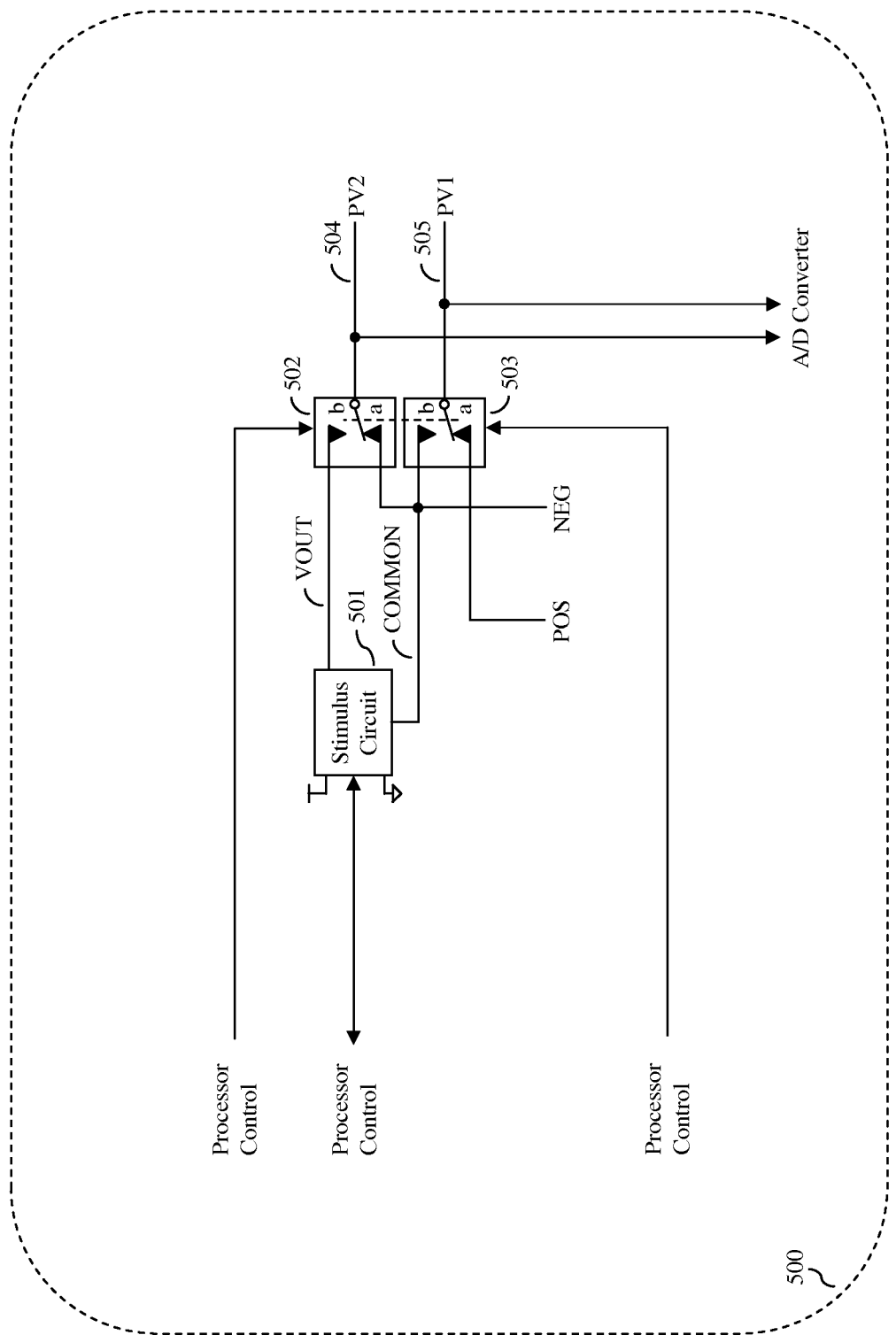
FIG. 5 illustrates an embodiment of the testing module of FIG. 1.

FIG. 5 illustrates one embodiment of a testing module referenced in FIG. 1. A fully configured testing module: uses one or more stimulus circuits to control switches in series and parallel monitoring units during active and passive tests, measures voltages during active and passive tests, and applies non-PV stimuli when needed. FIG. 5 conductors (PV1-PV2, POS, NEG) connect to the conductors of the same names in FIG. 1. During normal operation of the PV array, both switches (502-503) are in normal position ("a") so that conductors (PV1 and PV2) pass generated power to external equipment through terminals (POS and NEG). During active or passive tests, switches (502-503) may be toggled to test position ("b") so a non-PV stimulus (501) can be impressed through the power generation circuit. The non-PV stimulus produced by a stimulus circuit (501) may include a load, and may comprise pulsating current, AC current, multiple DC currents, varied current, pulsed DC current, or any electrical stimulus capable of driving one or more test currents through the modules being tested and toggling any topology switches installed in the array. The stimulus circuit may optionally generate synchronization signals so current and voltage measurements can be timed to occur when the stimulus circuit is at the desired value.

Figure 6:
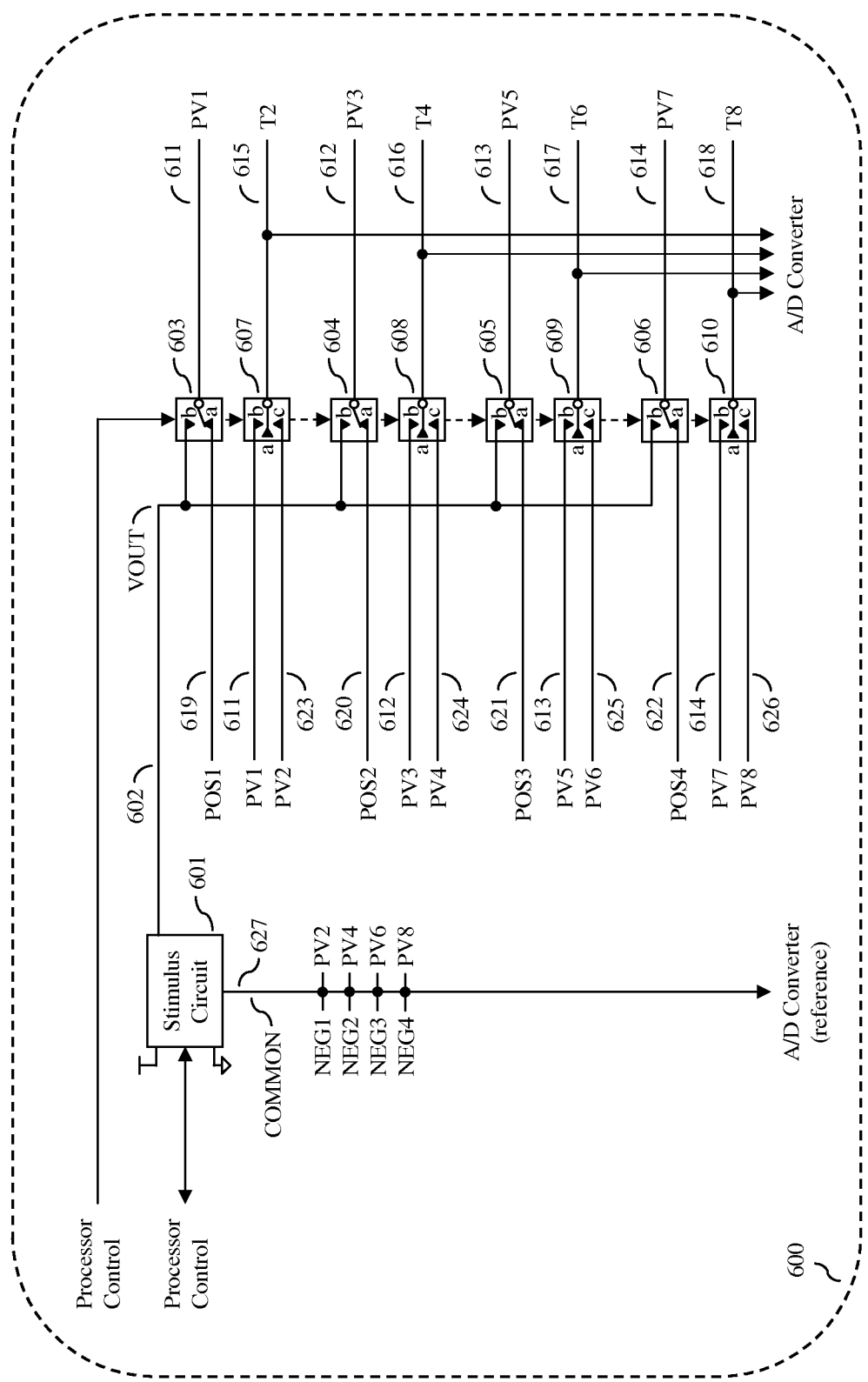
FIG. 6 illustrates an embodiment of the testing module of FIGS. 2-3.

FIG. 6 illustrates one embodiment of the testing module referenced in FIGS. 2-3. Named signals (T2, T4, T6, T8, PV1-PV8) in FIG. 6 connect to the signals of the same names in the FIGS. 2-3 alternative embodiments. For example, signal "PV1" (611) in FIG. 6 ties to signal "PV1" (201) in FIG. 2, or "PV1" (301) in FIG. 3. Some signals (T1, T3, T5, T7) in FIGS. 2-3 are unused in FIG. 6. FIG. 6 illustrates a testing module with four PV circuits (PV1-PV8 aka 611-614, 627) and four corresponding test conductors (T2, T4, T6, T8 aka 615-618), but this embodiment scales to support any number of PV circuits and any number of test conductors per string. Each switch (603-610) is individually controlled by a processor in order to create active and passive test circuits. Note that some of the switches (604-606) and signal names (PV3-PV8) in FIG. 6 are unused in FIG. 2. When FIG. 6 is used in FIG. 2 the unused switches may be eliminated and the unused signals consolidated (with PV1, PV2) as appropriate. During normal operation of the PV array, the stimulus switches (603-610) in FIG. 6 are in normal position ("a") so that the first PV circuit (PV1-PV2) passes generated power to external equipment through a first set of terminals (POS1, NEG1); the second PV circuit (PV3-PV4) pass generated power to external equipment through a second set of terminals (POS2-NEG2); and so forth. During active or passive tests, one of the stimulus switches (603-606) may be toggled to their test position ("b") so a non-PV stimulus (601) can be impressed on one of the power generation circuits (611-614). During active or passive tests, voltage may be measured (T2, T4, T6, T8 to Common aka 615-618 to 627) in order to gather data regarding the characteristics of the modules under test. Test switches (607-610) may also be toggled to their test positions ("b" or "c") in order to direct and measure active or passive current through a test circuit (T2, T4, T6, T8), or to toggle topology switches using active or passive current. For example, when FIG. 6 is used with the FIG. 9 circuit monitoring unit, directing current through a test circuit (T2, T4, T6, T8) in FIG. 6 actuates the topology switch (905) by allowing current to flow (through TEST) in FIG. 9, thereby altering the topology of the PV circuit and enabling substring testing. Though not illustrated in FIG. 6, voltages may be measured elsewhere (PV1, PV3, PV5, PV7 to Common) in order to characterize PV strings at the string-level without additional monitoring units. The non-PV stimulus produced by a stimulus circuit (601) may include pulsating current, AC current, multiple DC currents, varied current, pulsed DC current, or any electrical stimulus capable of driving one or more current values through the modules being tested and toggling any topology switches installed in the array. Note that a fully configured stimulus circuit (601) must be capable of sourcing current bi-directionally in order to support passive testing of both PV modules and bypass diodes. All or part of the stimulus circuit (601) may be housed with other PV system components, for example, in a charge controller unit or inverter. The stimulus circuit may optionally generate synchronization signals so current and voltage measurements can be timed to occur when the stimulus circuit is at the desired value.

The testing module referenced in FIGS. 2-3 may be implemented in a variety of embodiments depending on whether it will be used with series or parallel monitoring units, how these other monitoring units are implemented, where current and voltage sensors are placed, and what tests are supported. For example, the parallel monitoring unit in FIG. 11 may be paired with a testing module capable of: a) driving a signal through the PV test circuit (PV+ and PV−) sufficient to actuate N switches (where N is the allowable depth of the AC modules); b) driving a signal through the PV test circuit (PV+ and PV−) sufficient to actuate 1 switch during passive tests; and c) measuring voltage, current, or IV pairs as the desired stimulus, open, load, and short are applied (across PV+ and PV−). In another example, the parallel monitoring unit in FIG. 10 may be paired with a testing module capable of: a) disconnecting the test conductors (1003, 1006) during normal operation; b) impressing one or more passive tests (1003, 1006); c) directing one or more active tests (1003, 1006); and toggling the topology switch (1011). Other testing modules are contemplated.

Figure 13:
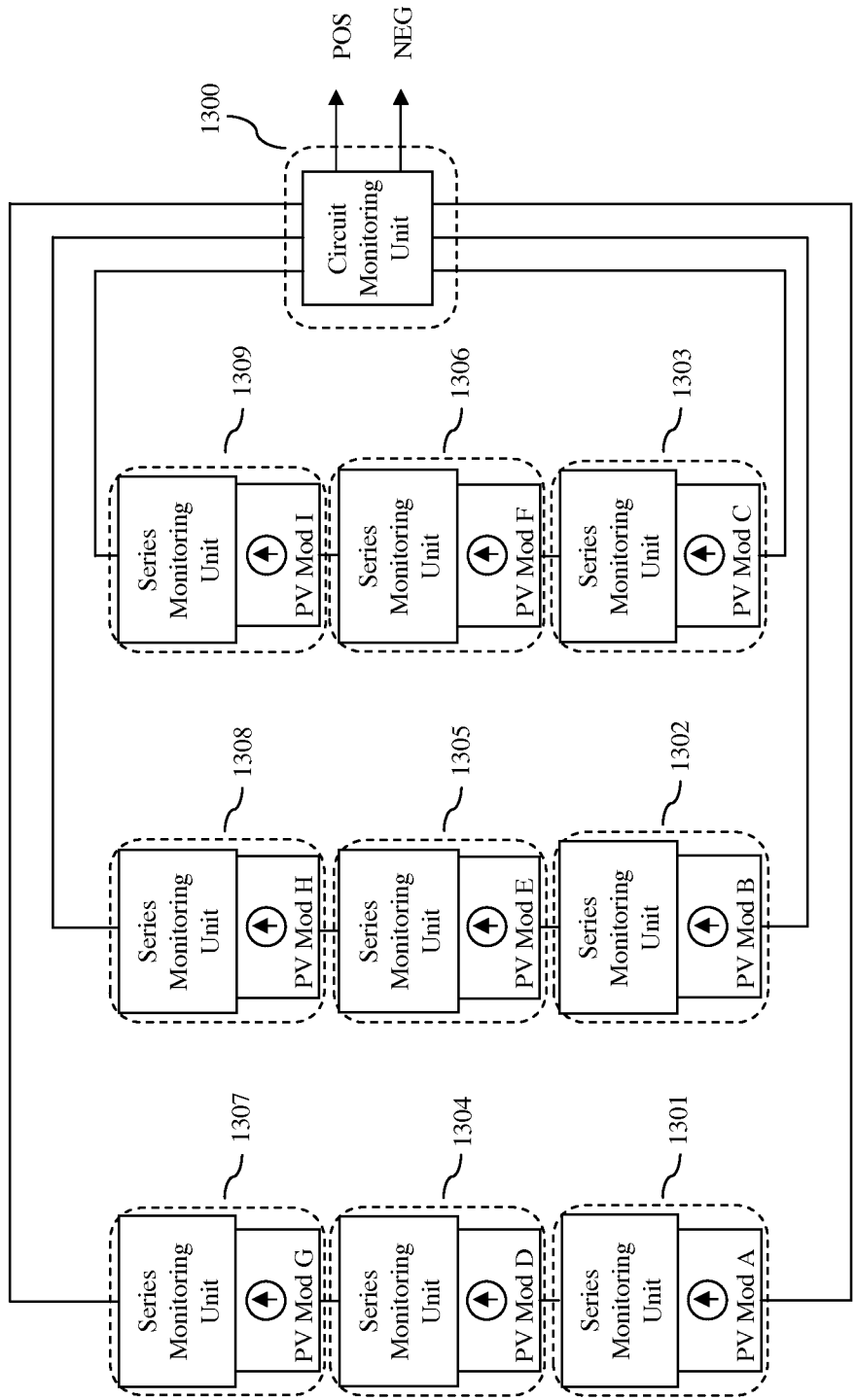
FIG. 13 illustrates a first representative PV installation incorporating one circuit monitoring unit and multiple series monitoring units of the invention.

FIG. 7 illustrates one embodiment of a single-conductor series monitoring unit of the invention. A series monitoring unit temporarily alters the topology of an installed PV string so the resulting substring can be characterized. For ease of illustration, the series monitoring unit (700) integrates one PV module (705), but the module may be replaced with any number of PV modules, or the series monitoring unit may be supplied stand-alone with no integrated PV modules. In FIG. 13 several PV modules with integrated series monitoring units (1301-1309) are illustrated in the context of a representative PV array. During normal DC operation of the PV array, each instance of this series monitoring unit (700) operates with its relay (703) in normal position ("A") so that generated PV current passes through the terminals (701-702) and the relay (703) and filter (704) present a small series resistance to the PV module (705). In this embodiment, the relay switches to a test position ("B") when a sufficient non-DC stimulus is applied across the terminals (701-702), and switches back ("A") when the stimulus is removed. When several series monitoring units of this embodiment are wired in series and the filter (704) is chosen to filter the applied non-DC stimulus, each series monitoring unit will switch in a cascading sequence, first to last. The relay (703) is chosen with sufficient switching delay to allow passive or active current and voltage to be measured at each position in the switching sequence. In FIG. 13, the active and passive characteristics of each substring sequence (ADG, DG, G) may be estimated by controlling that string's (ADG) series monitoring units (1301, 1304, 1307). Note that the characteristics of two substrings may be subtracted in order to calculate the characteristics of the complementary substring. The filter (704) is selected to attenuate the non-DC stimulus that operates the switch (703), and the relay (703) is selected to actuate when that specific non-DC stimulus is applied. For example, the stimulus may be AC current of a particular frequency band, the filter may be a band-stop filter, and the relay may be an induction relay. Note that relay 703 may be replaced with a double throw, make-then-break induction relay illustrated as 703A. The directionality of the device may also be reversed.

FIG. 8 illustrates an alternative single-conductor series monitoring unit of the invention. For ease of illustration, the series monitoring unit (800) integrates one PV module (805), but the module may be replaced with any number of PV modules, or the series monitoring unit may be supplied stand-alone with no integrated PV modules. In FIG. 13 several PV modules with integrated series monitoring units (1301-1309) are illustrated in the context of a representative PV array. During normal DC operation of the PV array, each instance of this series monitoring unit (800) operates with its relay (803) in normal position ("A") so that generated PV current passes through the terminals (801-802), the capacitor (804) and resistor (807) present a large DC shunt resistance to the PV module (805), and the filter (806) presents a small series resistance to the PV module (805). In this embodiment, the relay toggles to a test position ("B") when a sufficient non-DC stimulus is applied across the terminals (801-802), and toggles back ("A") when the stimulus is removed. When several series monitoring units of this embodiment are wired in series and a sufficient non-DC stimulus is applied across the series, each series monitoring unit will switch in a cascading sequence, first to last. The filter (806) is selected to attenuate the non-DC stimulus that operates the switch (803), and the relay (803) is selected to actuate when that specific non-DC stimulus is applied. For example, the stimulus may be AC current of a particular frequency band, the filter may be a band-stop filter, and the relay may be an attracted-armature-type AC relay. The capacitor (804) is sized to store the energy of the non-DC stimulus and the resistor is sized to ensure reliable operation of the relay (803). The directionality of the device may also be reversed.

Figure 9:
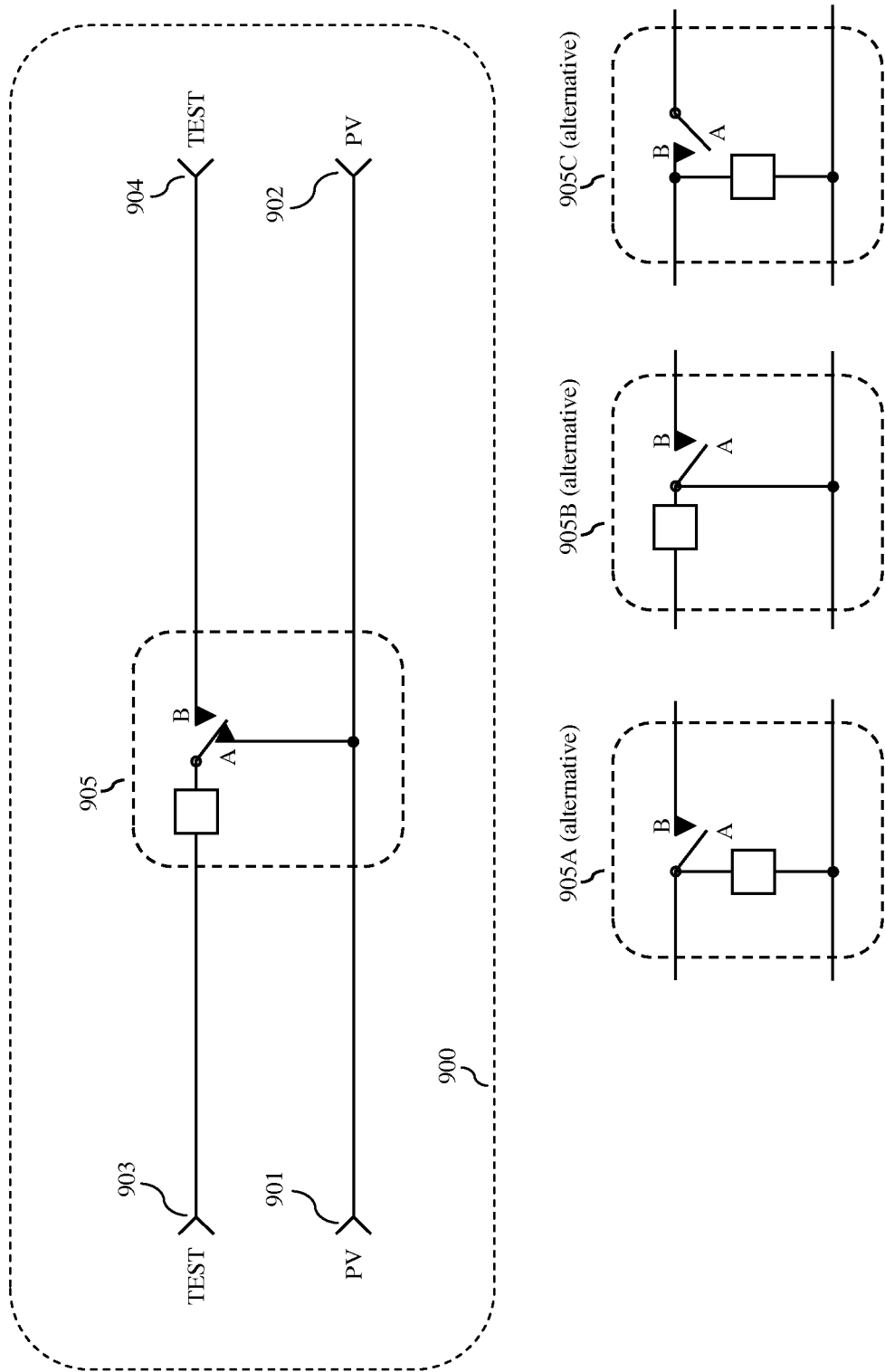
FIG. 9 illustrates a third embodiment of a PV series monitoring unit of the invention.
Figure 10:
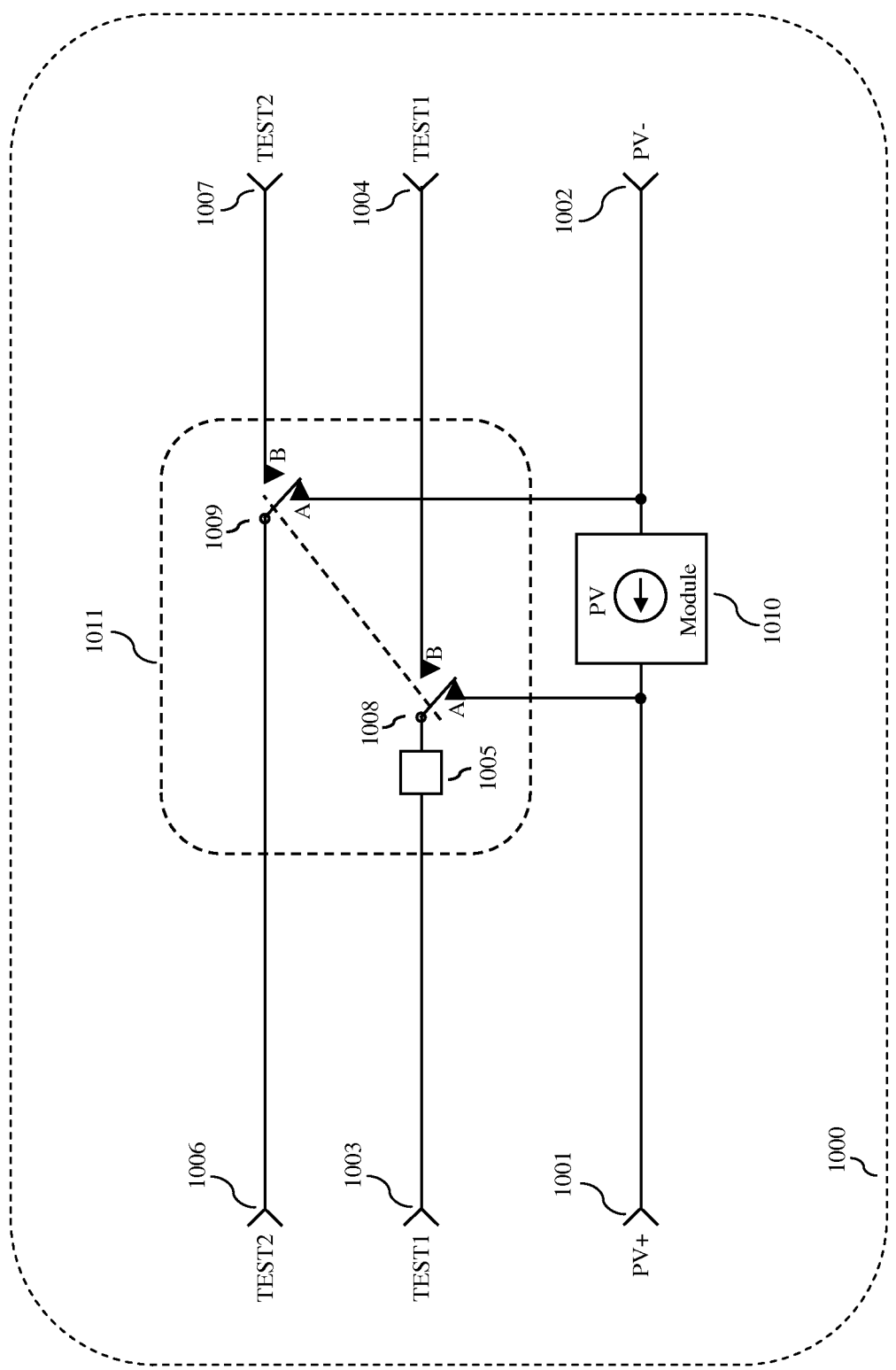
FIG. 10 illustrates a fourth embodiment of a PV series monitoring unit of the invention, integrated into a PV junction box.
Figure 14:
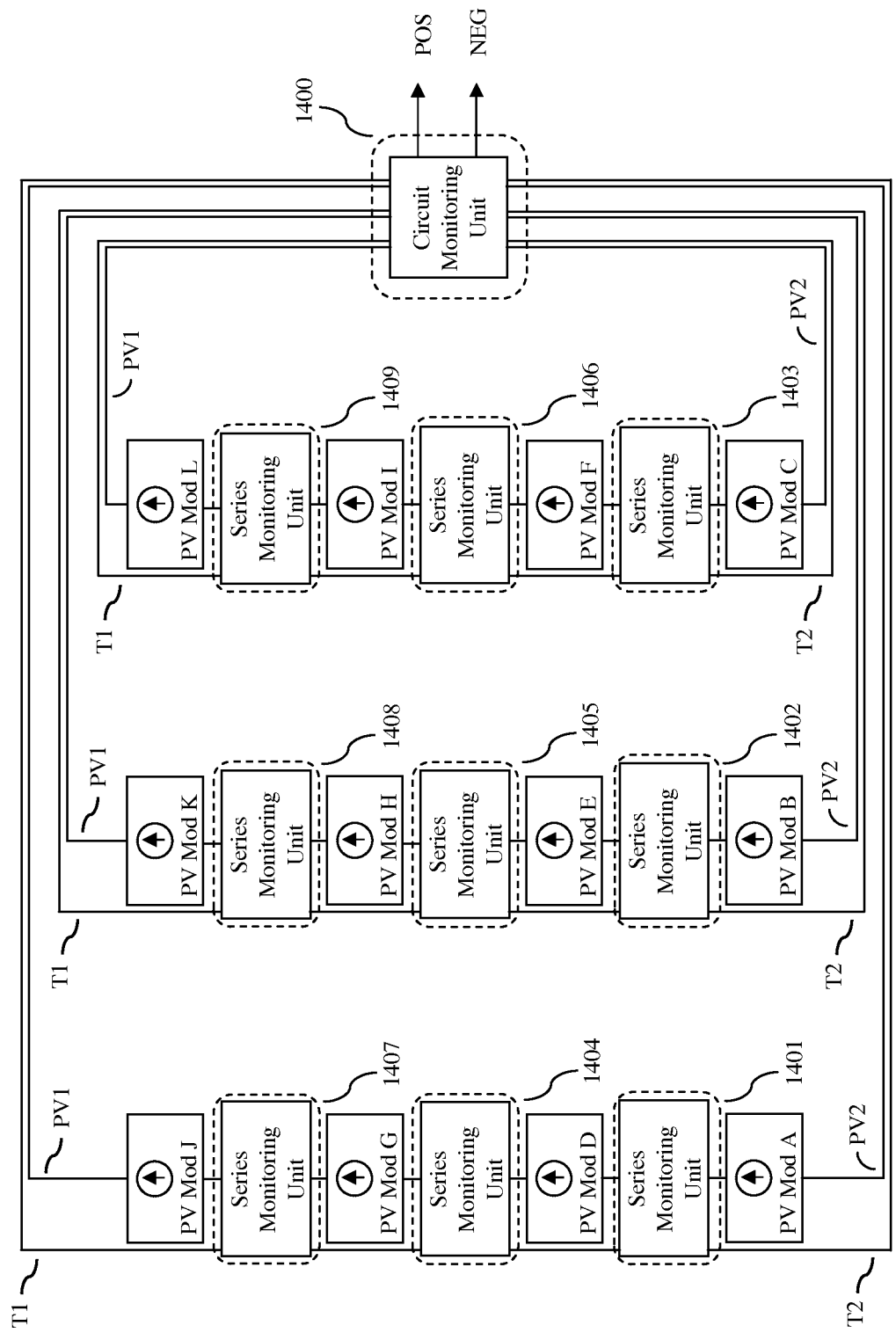
FIG. 14 illustrates a second representative PV installation incorporating one circuit monitoring unit and multiple series monitoring units of the invention.

FIG. 9 illustrates one embodiment of a dual-conductor series monitoring unit of the invention. During normal operation of the PV array the relay (905) is in normal positioned ("A") so that generated PV current passes through the PV terminals (901, 902) and no current passes through the relay (905). In this embodiment, substring tests may be run by drawing current through the relay's (905) test terminal (903) and measuring the resulting current, voltage, or IV pair. A precision diode may optionally be wired across the coil of the relay (905) in order to increase the consistency of the voltage drop across the coil and thus increase the accuracy of the test. The relay (905) is toggled to its test position ("B") when there is a sufficient current moving through the test terminal (903), and toggled back to normal position ("A") when the current through the test terminal (903) is stopped. In this embodiment, the relay (905) is selected to have a switching delay so that when several series monitoring units (900) are wired in series (FIG. 14) they may all be toggled to test position ("B") in a sequential cascade. The relay (905) is also selected to make-then-break the transition (A-to-B) so the current through the test terminal (903) is essentially uninterrupted. Data is gathered by measuring the current, voltage, or IV pair of each circuit topology created by the switches and is used to characterize that circuit topology. In FIG. 14, the active and passive characteristics of each substring sequence (A, AD, ADG, ADGJ) may be estimated by controlling that substring's (ADGJ) series monitoring units (1401, 1404, 1407). Note that the characteristics of two substrings may be subtracted in order to calculate the characteristics of the complementary substring. This embodiment may also be implemented using several variations (905A, 905B, 905C) of the relay (905) and with other switch configurations and types. One unidirectional alternative is a latching relay, wherein the relay latches to a test contact ("B") when a sufficient current pulse is applied in one direction through a coil connected to the normal contact ("A"), and vice-versa.

FIG. 10 illustrates one embodiment of a triple-conductor (PV, TEST1, TEST2) series monitoring unit of the invention. For ease of illustration, this series monitoring unit (1000) integrates one PV module (1010), but the module may be replaced with any number of PV modules connected in series, or the series monitoring unit may be supplied stand-alone with no integrated PV modules. In FIG. 10, both poles (1008-1009) of the relay (1011) are normally in position ("A") so that generated PV current passes through the PV terminals (1001, 1002) and no current passes through the relay (1011). A sufficient current flowing through the test terminal (1003) toggles both poles (1008-1009) to test position ("B") and when the current is stopped both poles (1008-1009) toggle back to their normal position ("A"). A precision diode may optionally be wired across the coil (1005) in order to increase the consistency of the voltage drop across the coil and thus increase the accuracy of the measurements made though the coil (1005). The relay (1011) is selected to make-then-break the transitions (A-to-B) of both poles (1008-1009) so the current through the test terminal (1003) is essentially uninterrupted. The relay (1011) is also selected to have a switching delay so that when several monitoring units (1000) are installed in series they can be set in sequence while measuring each stable current, voltage, or IV pair. If installed in a PV string at each module junction this embodiment allows a circuit monitoring unit to individually assess the active and passive characteristics of each PV module in the string. So if the 2-conductor wiring in FIG. 14 is replaced by 3-conductor wiring, this embodiment allows the active and passive characteristics of each module in a string (A, D, G, J) to be individually estimated by controlling that string's (ADGJ) series monitoring units (1401, 1404, 1407). The directionality of the device may be reversed. Other single-conductor, dual-conductor, and triple-conductor series monitoring units are contemplated, such as powered units employing a solid state relay.

Figure 11:
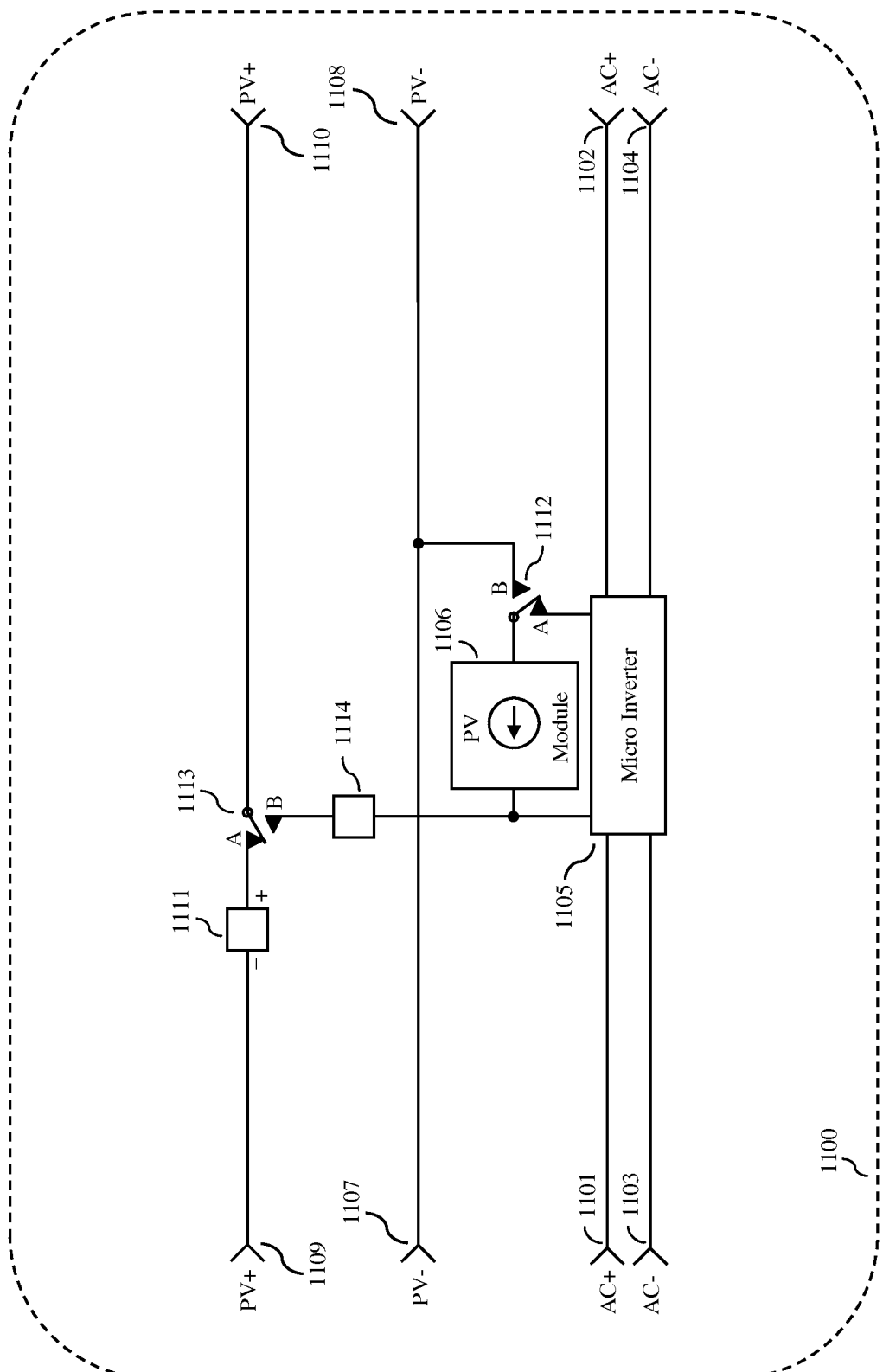
FIG. 11 illustrates an embodiment of a PV parallel monitoring unit of the invention, integrated into a PV junction box.
Figure 17:
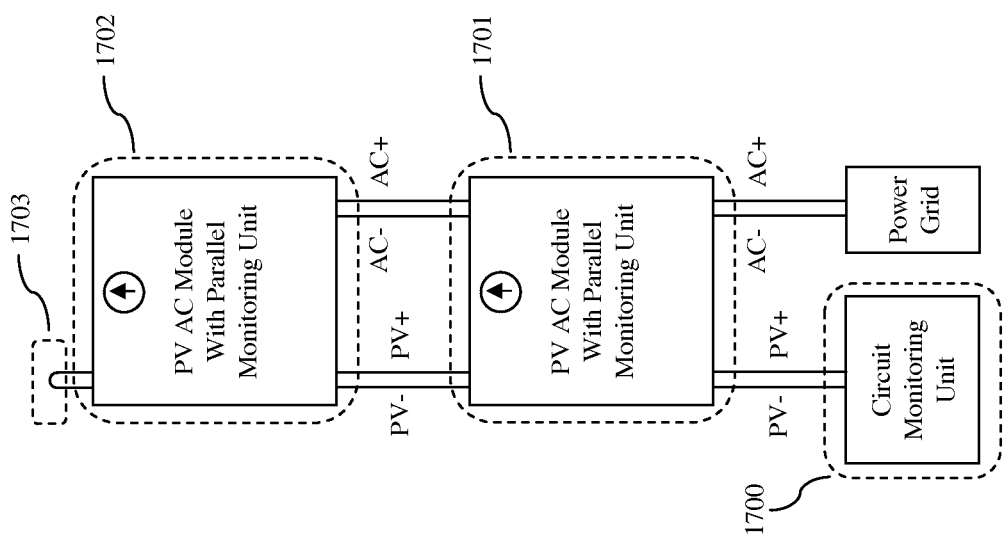
FIG. 17 illustrates a representative PV installation incorporating a circuit monitoring unit and two parallel monitoring units of the invention.

FIG. 11 illustrates one embodiment of a parallel monitoring unit (1100) of the invention. A parallel monitoring unit isolates PV modules or panels that are installed in parallel so they can be characterized by a circuit monitoring unit. For ease of illustration, the parallel monitoring unit (1100) integrates one PV module (1106), but the module may be replaced with any number of PV modules, or the series monitoring unit may be supplied stand-alone with no integrated PV modules. For ease of illustration, the parallel monitoring unit (1100) also integrates a micro-inverter (1105), but the parallel monitoring unit may also be supplied stand-alone with no integrated micro-inverter. FIG. 17 illustrates two parallel monitoring units (1100) in the context of a representative PV array. During normal operation of the PV array, each parallel monitoring unit sits with both poles (1112-1113) latched in normal position ("A") so that generated AC power passes through the AC terminals (1101-1104). To use the parallel monitoring units, the circuit monitoring unit applies a pulse on the PV circuit (1110, 1108), which runs through each parallel monitoring unit (1701-1702) and through the loop-back fixture (1703) at the end of the array. The pulse energizes the coil (1111) in each parallel monitoring unit in the array. As a result, both poles (1112-1113) in each parallel monitoring unit toggle and latch in their test positions ("B"), isolating the PV modules from each other and from their micro-inverters. To perform passive tests, the circuit monitoring unit may then apply test stimuli on the PV circuit (1108-1110) in order to record the first module's (1701) passive characteristics. To perform active tests, the circuit monitoring unit may apply an open, short, load, or optional signal on the PV circuit (1108-1110) in order to record the first module's (1701) active characteristics. When the circuit monitoring unit directs a sufficient current through the coil (1114), both switches (1112-1113) in the first module (1701) toggle back to normal operating position ("A"). The circuit monitoring unit may then collect data from the next parallel monitoring unit (1702), and testing may continue in this fashion until each module, or group of modules, has been tested and all the switches (1112-1113) in all of the parallel monitoring units are reset to their normal operating position ("A"). Note that the active or passive current used to toggle the switches may be measured in order to help characterize the module or modules under test. In this embodiment, the latching relay (1111-1114) is selected to have a switching delay so that several parallel monitoring units (1100) can be set in unison and reset in a sequential cascade. A precision diode may be connected across the coil (1114) to increase the precision of the test measurements. An automatic loop back fixture (1703) may also be implemented in this embodiment whereby each parallel monitoring unit is constructed with a short-circuit between the next-unit terminals (1107, 1009) that is automatically broken when a next-unit is installed. This parallel monitoring unit may be implemented using other switch types, other switch configurations, and other wiring schemes. In one alternative embodiment, one pole (1112) may be eliminated with the introduction of a separate micro-inverter-disable signal, and the remaining relay (1111-1114) replaced by a non-latching relay (905, 905A, 905B, 905C, or equivalent). Other parallel monitoring unit embodiments are contemplated.

Figure 12:
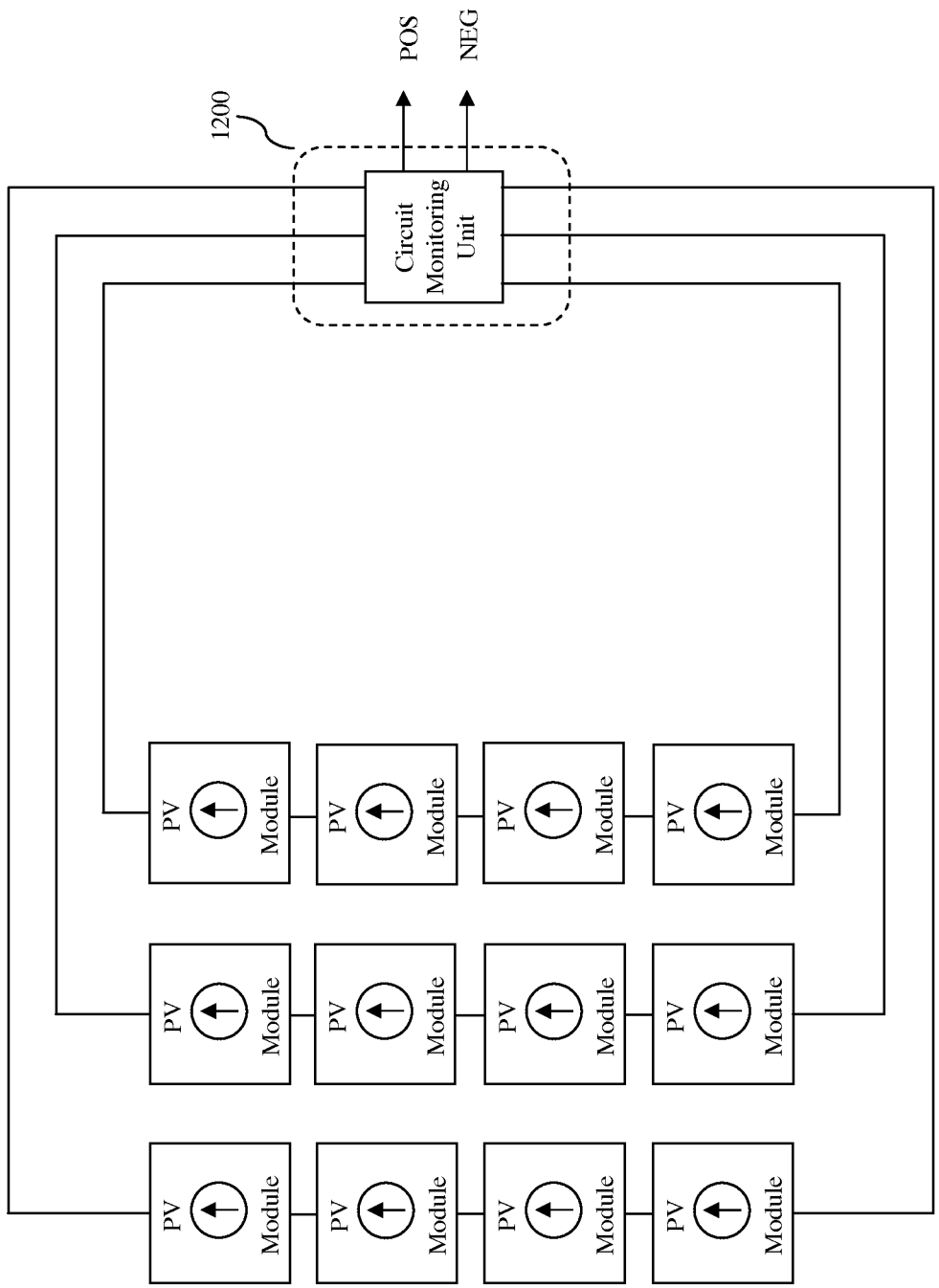
FIG. 12 illustrates a representative PV installation incorporating one circuit monitoring unit of the invention.

FIG. 12 illustrates a PV array installation where a circuit monitoring unit is represented in-context (1200). The circuit monitoring unit in FIG. 12 performs active and passive tests by measuring current or IV pairs in the array wiring that carries PV-generated current. In a current test, the processor collects contemporaneous current values from each parallel string and looks for outlying values. In an IV test the processor contemporaneously records voltage and current pairs from the parallel strings and can thus compute absolute resistance values and diode parameters for each string.

FIG. 13 illustrates a PV installation where several single-conductor series monitoring units are represented in context (1301-1309) together with a circuit monitoring unit represented in context (1300). The series monitoring units in FIG. 13 may be installed separately or integrated into PV modules, junction boxes, mounting equipment, inverters, or other PV equipment. During normal operation of the PV array, each instance of the series monitoring unit (1301-1309) sits so that generated PV current passes through the PV modules (A-I) and series monitoring units (1301-1309). During normal operation, the circuit monitoring unit (1300) may collect active and passive, string-level current and IV measurements without using the series monitoring units. To use the series monitoring units, the circuit monitoring unit (1300) applies or removes a non-PV stimulus on the array wiring. As a result, the series monitoring units take one or more PV modules off-line to allow characterization of the one or more remaining modules. To return to normal operation, the circuit monitoring unit (1300) applies or removes a non-PV stimulus on the parallel PV circuits.

FIG. 14 illustrates a PV installation where several dual-conductor series monitoring units are represented in context (1401-1409) together with a circuit monitoring unit represented in context (1400). The series monitoring units in FIG. 14 may be installed separately or integrated into PV modules, junction boxes, mounting equipment, inverters, or other PV equipment. During normal operation of the PV array, each instance of the series monitoring unit (1401-1409) sits so that generated PV current passes through the PV modules (A-L) and series monitoring units (1401-1409). During normal operation the circuit monitoring unit (1400) may collect active and passive, string-level current and IV measurements without using the series monitoring units. To use the series monitoring units, the circuit monitoring unit (1400) applies or removes PV current or a non-PV stimulus on one or more of the array circuits (PV1-PV2; T1-T2), causing the series monitoring units to alter the topology of one or more of the PV circuits, and allowing one or more substring(s) to be characterized by the circuit monitoring unit (1400). To return to normal operation, the circuit monitoring unit (1400) applies or removes PV current or a non-PV stimulus on one or more of the array circuits (PV1-PV2; T1-T2).

Figure 15:
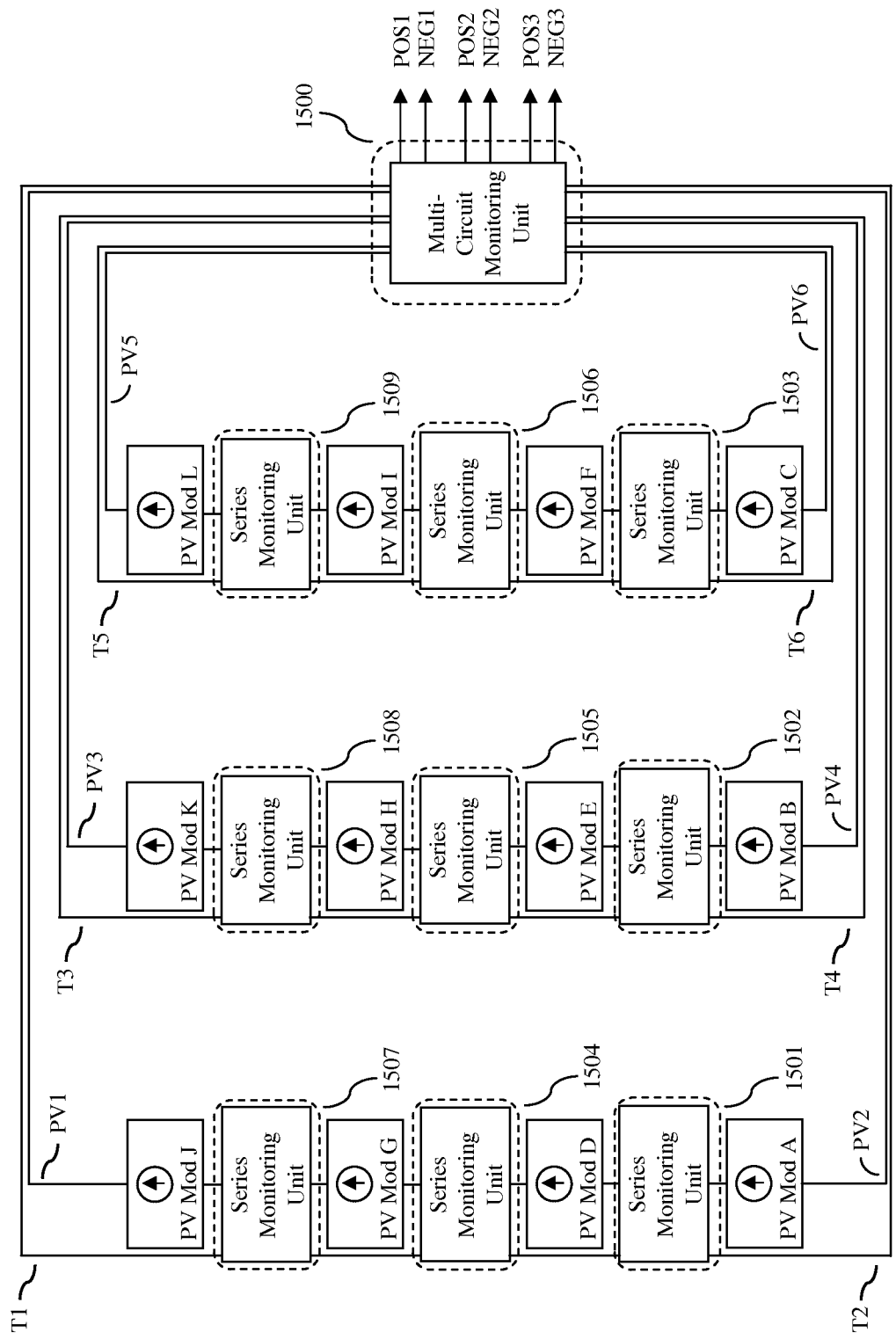
FIG. 15 illustrates a representative PV installation incorporating one multi-circuit monitoring unit and multiple series monitoring units of the invention.

FIG. 15 illustrates a PV installation where several dual-conductor series monitoring units are represented in context (1501-1509) together with a multi-circuit monitoring unit represented in context (1500). The series monitoring units in FIG. 15 may be installed separately or integrated into PV modules, junction boxes, mounting equipment, inverters, or other PV equipment. During normal operation of the PV array, each instance of the series monitoring unit (1501-1509) sits so that generated PV current passes through the PV modules (A-L) and series monitoring units (1501-1509). During normal operation, the multi-circuit monitoring unit (1500) may collect active and passive, string-level current and IV measurements without using the series monitoring units. To use the series monitoring units, the circuit monitoring unit (1500) applies or removes PV current or a non-PV stimulus on one or more of the array circuits (PV1-PV2; T1-T2; PV3-PV4; T3-T4; PV5-PV6; T5-T6), causing the series monitoring units to alter the topology of one or more of the PV circuits, and allowing one or more substring(s) to be characterized by the circuit monitoring unit (1500). To return to normal operation, the circuit monitoring unit (1500) applies or removes PV current or a non-PV stimulus on one or more of the array circuits (PV1-PV2; T1-T2; PV3-PV4; T3-T4; PV5-PV6; T5-T6).

Figure 16:
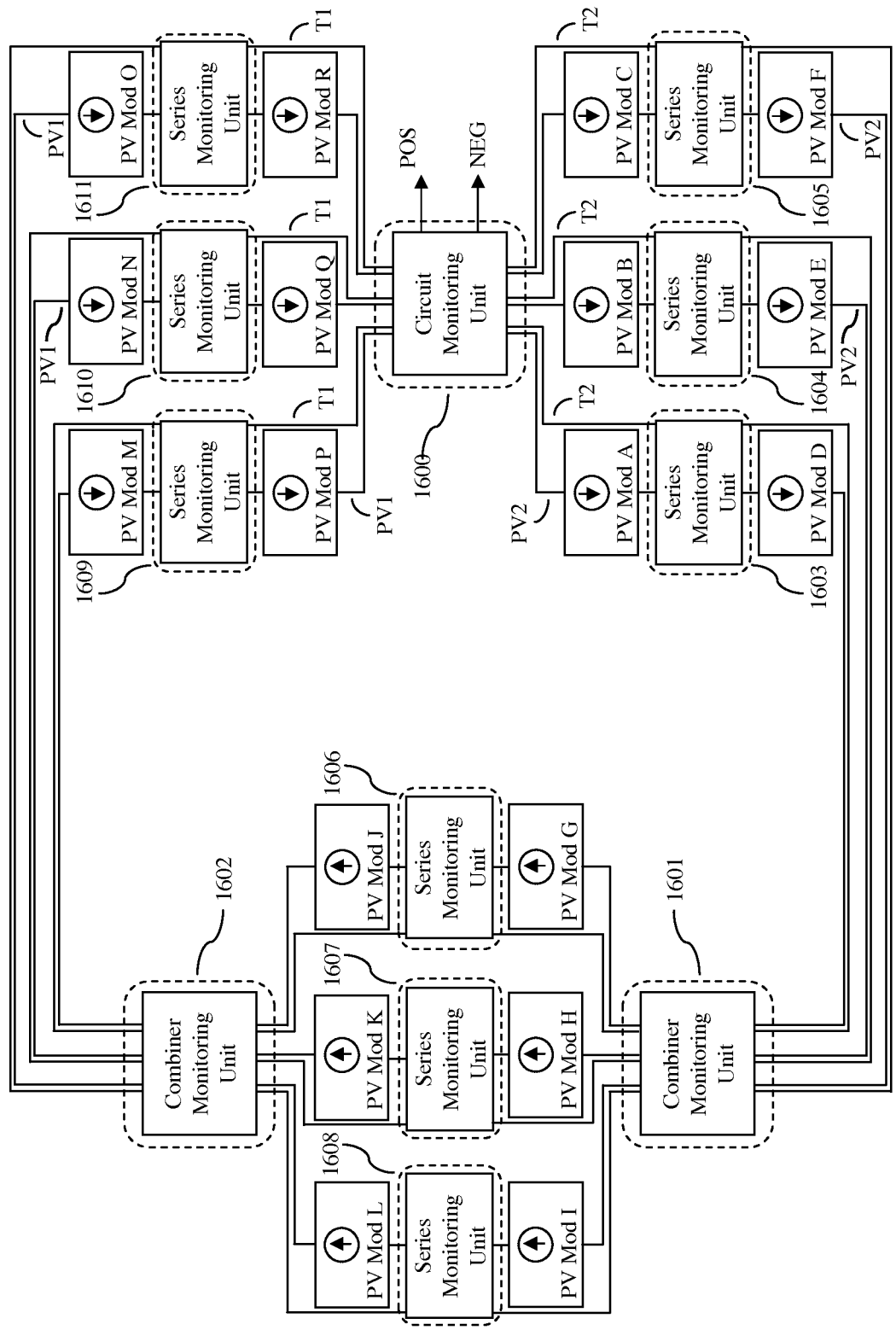
FIG. 16 illustrates a representative PV installation incorporating one circuit monitoring unit, two combiner monitoring units, and multiple series monitoring units of the invention.

FIG. 16 illustrates a PV installation where several dual-conductor series monitoring units are represented in context (1603-1611), together with a circuit monitoring unit represented in context (1600), and two combiner monitoring units represented in context (1601-1602). The series monitoring units in FIG. 16 may be installed separately or integrated into PV modules, junction boxes, mounting equipment, inverters, or other PV equipment. During normal operation of the PV array, each instance of the series monitoring unit (1603-1611) sits so that generated PV current passes through the PV modules (A-R) and series monitoring units (1603-1611). During normal operation, the circuit monitoring unit (1600) and the combiner monitoring units (1601-1602) may collaborate to collect active and passive, string-level current and IV measurements without using the series monitoring units. To use the series monitoring units, the circuit monitoring unit (1600) applies or removes PV current or a non-PV stimulus on one or more of the array circuits (PV1-PV2; T1-T2), causing the series monitoring units to alter the topology of one or more of the PV circuits, and allowing one or more substring(s) to be characterized by the circuit monitoring unit (1600) and the combiner monitoring units (1601-1602). To return to normal operation, the circuit monitoring unit (1600) applies or removes PV current or a non-PV stimulus on one or more of the array circuits (PV1-PV2; T1-T2).

FIG. 17 illustrates a PV installation where two AC PV modules with integrated parallel monitoring units are represented in context (1701-1702), together with a circuit monitoring unit represented in context (1700). The parallel monitoring units in FIG. 17 may be installed separately or integrated into PV modules, junction boxes, mounting equipment, inverters, or other PV equipment. During normal operation of the PV array, each parallel monitoring unit (1701-1702) sits so that AC power is generated by its associated PV module and micro-inverter. In order to collect active or passive IV measurements, the circuit monitoring unit (1700) applies or removes PV current or a non-PV stimulus on the PV circuit (PV+ and PV−) or AC circuit (AC+ and AC−), causing the parallel monitoring units to isolate one or more PV modules, and allowing the circuit monitoring unit (1700) to characterize the isolated module(s). To return to normal operation, the circuit monitoring unit (1700) applies or removes PV current or a non-PV stimulus on the PV circuit (PV+ and PV−) or AC circuit (AC+ and AC−).

The data collected by the monitoring system of the invention may be processed by the monitoring system or by a network processor to determine the active and passive characteristics of the strings, substrings, and modules that comprise a PV installation, and make maintenance recommendations. Active and passive tests at the string, substring, and module levels early in the life of an installation may be used to set baselines for future tests. Early variability between strings, substrings, or modules, when within acceptable limits, indicates normal manufacturing, installation, and measurement variability. In new installations, significant imbalances may indicate that installers may need to address a design, equipment, mounting, or thermal issue. As an installation ages, resistance or relative currents may be compared over time to flag unusual changes in the characteristics of one or more strings, substrings, or modules. Such changes may indicate: increased series resistance, such as corrosion; decreased shunt resistance, such as metal migration; or theft; and may suggest replacement or maintenance of one or more modules. When the active test of a string, substring, or module is abnormal but the passive test is normal, there may be a shading or soiling issue that may be addressed. If shading and soiling have been eliminated as potential issues, then coating or encapsulant degradation may be indicated. Anomalies in PV strings, substrings, or modules may be determined by comparing measured parameters with other measured parameters, comparing measured parameters over time, comparing measured parameters to published specifications, comparing measured parameters to idealized models, or other parameter comparisons. Passive IV tests may be used to normalize data gathered from active IV tests, that is, some of the inherent variability of PV modules, substrings, or strings can be measured using passive tests and subtracted from active tests to increase their sensitivity to illumination issues. Note that the night sky produces a small back-ground voltage which can be normalized by performing baseline tests during very dark nights when the installation is new or newly refurbished. The active and passive parameters of an array, sub-array, string, or module collected by the monitoring system are made available to stake holders. Software or hardware flags may also be set by the stake holders so that data, data changes, anomalies, informative notifications, maintenance recommendations, and other changes are automatically reported when they are outside customizable thresholds.

Switches in this invention may be implemented by a number of means including, but not limited to, electronic, electromechanical, electromagnetic, electro-acoustic or electro-optical switches common in the art. The monitoring system may include lightning surge arrest protection. Some components of the monitoring system may be implemented with electrical isolation from the PV power circuits. The monitoring units of the invention may be integrated into another PV system component, such as circuit combiner, transformer, disconnect unit, charge controller, fuse box, surge protector, breaker, transfer switch, load center, ground-fault unit, service panel, or inverter.

I do not wish to limit my invention to the examples and graphs described herein but rather to include such modifications as would be obvious to the ordinary worker skilled in the art of designing PV monitoring systems or measuring the characteristic parameters of photovoltaic modules.

The invention claimed is:

1. An apparatus for monitoring a PV (photovoltaic) installation, said installation comprising one or more PV modules coupled in a circuit topology, said apparatus comprising:
    a stimulus circuit configured to apply, in-situ, an electrical stimulus through one or more installed modules of said PV installation, wherein said stimulus comprises a test current in an opposite direction from an illuminated direction;
    a sensor circuit configured to measure at least one passive response of said installed modules to said stimulus; and
    a processor configured to record one or more passive electrical parameters of at least one of said PV modules and said installed modules.

2. The apparatus of claim 1, wherein said parameters are comprised of one or more relative or absolute resistance values.

3. The apparatus of claim 1, wherein said stimulus is comprised of a current pulse.

4. The apparatus of claim 1, further comprising: one or more switches configured to alter said topology of said PV modules within said PV installation.

5. The apparatus of claim 4, wherein said altering comprises at least one of: applying an effective shunt around at least one of said PV modules and applying an effective open circuit on an electrode of at least one of said PV modules.

6. A method of monitoring a PV (photovoltaic) installation, said installation comprising one or more PV modules coupled in a circuit topology, said method comprising:
    selecting one or more installed modules of said PV installation;
    applying, in-situ, at least one electrical stimulus through said installed modules, wherein said stimulus comprises a test current pulse in an opposite direction from an illuminated direction;
    making at least one of: a current, voltage, and IV (current-voltage) measurement; and
    recording one or more passive electrical parameters of at least one of said PV modules and said installed modules.

7. The method of claim 6, further comprising: toggling at least one switch to alter said topology of said PV modules within said PV installation.

8. The method of claim 7 wherein said altering comprises at least one of: applying an effective shunt around at least one of said PV modules and applying an effective open circuit on an electrode of at least one of said PV modules.

9. A switch configuration for altering the topology of a PV (photovoltaic) installation, said configuration comprising: a switch having at least a first, second, and third terminal and at least a first and second position; and an actuator for actuating said switch; wherein:
    said second terminal connects to a first electrode of an installed PV string;
    in said first position said first terminal is directly or indirectly connected to said second terminal, and said third terminal is isolated from said first terminal and said second terminal;
    in said second position said first terminal is directly or indirectly connected to said third terminal; and
    said actuator is triggered by a current change in at least one of said first, second, or third terminals.

10. The configuration of claim 9, wherein said actuator is electromagnetic.

11. The configuration of claim 9, wherein said actuator is electronic.

12. The configuration of claim 9, wherein said third terminal connects directly or indirectly to a second electrode of said string, so that said second position applies a shunt across a substring of said string.

13. The configuration of claim 12, wherein said shunt is essentially comprised of a short, load, or voltage clamp.

14. The configuration of claim 12, further comprising a signal filter connected to said substring, wherein said second position applies said shunt across said filter and said sub string.

15. An apparatus for in-situ monitoring of a PV (photovoltaic) installation, said installation comprising one or more PV modules coupled in a circuit topology, said apparatus comprising:
- a sensor circuit configured to record at least one characteristic of one or more installed modules of said PV installation;
- a switch configured to temporarily alter said topology of said PV modules; and
- a processor configured to trigger said switch by causing a signal to be propagated through an electrode of at least one of said PV modules.

16. The apparatus of claim 15 wherein said signal comprises one of: applying a non-PV stimulus, removing a non-PV stimulus, applying a PV current, and removing a PV current.

17. An apparatus for in-situ monitoring of a PV (photovoltaic) installation, said installation comprising one or more PV modules coupled in a circuit topology, said apparatus comprising:
- a processor;
- a sensor circuit configured to record at least one characteristic of one or more of said PV modules;
- a plurality of switches wherein each said switch is configured to alter said topology of said PV modules; and
- a conductor configured such that a non-oscillating signal driven by said processor on said conductor initiates a temporally sequential actuation of said switches.

18. A method of monitoring a PV (photovoltaic) installation having one or more installed bypass diodes, said method comprising:
- selecting one or more selected diodes of said installed bypass diodes;
- applying, in-situ, at least one non-PV electrical stimulus through said selected diodes;
- making at least one of: a current, voltage, and IV (current-voltage) measurement; and
- recording one or more passive electrical parameters of at least one of said selected diodes and said installed bypass diodes.

19. An apparatus for in-situ monitoring of a PV (photovoltaic) installation, said installation having one or more installed bypass diodes, said apparatus comprising:
- a stimulus circuit configured to apply a non-PV electrical stimulus through one or more selected diodes of said installed bypass diodes;
- a sensor circuit configured to measure at least one passive response of said selected diodes to said stimulus; and
- a processor configured to record one or more passive electrical parameters of at least one of said selected diodes and said installed bypass diodes.

20. A method for in-situ monitoring of a PV (photovoltaic) installation, said installation comprising one or more PV modules coupled in a circuit topology, said method comprising:
- selecting a time to trigger a switch;
- triggering said switch at said time by driving a signal through an electrode of at least one of said PV modules, wherein said triggering alters said topology of said PV modules; and
- recording at least one characteristic of one or more installed modules of said PV installation.

21. The method of claim 20 wherein said signal comprises one of:
applying a non-PV stimulus, removing a non-PV stimulus, applying a PV current, and removing a PV current.

22. A method for in-situ monitoring of a PV (photovoltaic) installation, said installation comprising one or more PV modules coupled in a circuit topology, said method comprising:
- initiating a temporally sequential actuation of a plurality of switches by impressing with a processor a non-oscillating signal on a conductor, wherein each said actuation of each said switch of said plurality alters said topology of said PV modules; and
- recording, with a sensor circuit, at least one characteristic of one or more of said PV modules.

23. An apparatus for in-situ monitoring of a PV (photovoltaic) installation, said installation comprising one or more PV modules, said apparatus comprising:
- a stimulus circuit configured to apply, in-situ, an electrical stimulus through said PV modules, wherein said stimulus circuit is coupled to a power circuit that provides electrical energy to said stimulus circuit, and said power circuit is configured to comprise at least one battery;
- a sensor circuit configured to measure at least one passive response of said PV modules to said stimulus; and
- a processor configured to record one or more passive electrical parameters of one or more of said PV modules.

24. A method of monitoring a PV (photovoltaic) installation, said installation comprising one or more PV modules, said method comprising:
- selecting said PV modules;
- applying, in-situ, at least one electrical stimulus through said PV modules, wherein said stimulus is produced by a stimulus circuit wherein said stimulus circuit is coupled to a power circuit that provides electrical energy to said stimulus circuit, and said power circuit is configured to comprise at least one battery;
- making at least one of: a current, voltage, and IV (current-voltage) measurement; and
- recording one or more passive electrical parameters of one or more of said PV modules.

25. An apparatus for in-situ monitoring of a PV (photovoltaic) installation, said installation comprising one or more PV modules, said apparatus comprising:
- a stimulus circuit configured to apply, in-situ, an electrical stimulus through said PV modules, wherein said stimulus comprises a pulsed DC current;
- a sensor circuit configured to measure at least one passive response of said PV modules to said stimulus; and
- a processor configured to record one or more passive electrical parameters of one or more of said PV modules.

26. A method of monitoring a PV (photovoltaic) installation, said installation comprising one or more PV modules, said method comprising:

selecting said PV modules;
applying, in-situ, at least one electrical stimulus through said PV modules, wherein said stimulus is produced by a stimulus circuit wherein said stimulus comprises a pulsed DC current;
making at least one of: a current, voltage, and IV (current-voltage) measurement; and
recording one or more passive electrical parameters of one or more of said PV modules.

* * * * *